(12) United States Patent
Hasegawa

(10) Patent No.: US 12,431,754 B2
(45) Date of Patent: Sep. 30, 2025

(54) INSULATOR AND MOTOR

(71) Applicant: FUJITSU GENERAL LIMITED, Kanagawa (JP)

(72) Inventor: Tomooki Hasegawa, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 353 days.

(21) Appl. No.: 18/025,105

(22) PCT Filed: Sep. 21, 2021

(86) PCT No.: PCT/JP2021/034593
§ 371 (c)(1),
(2) Date: Mar. 7, 2023

(87) PCT Pub. No.: WO2022/071025
PCT Pub. Date: Apr. 7, 2022

(65) Prior Publication Data
US 2023/0336044 A1    Oct. 19, 2023

(30) Foreign Application Priority Data

Sep. 30, 2020  (JP) .................. 2020-166376

(51) Int. Cl.
*H02K 3/34*   (2006.01)
*H02K 3/52*   (2006.01)

(52) U.S. Cl.
CPC ............... *H02K 3/34* (2013.01); *H02K 3/52* (2013.01)

(58) Field of Classification Search
CPC ............ H02K 3/522; H02K 3/34; H02K 3/28; H02K 3/50; H02K 3/18; H02K 3/46; H02K 3/325; H02K 3/52; H02K 3/345; H02K 3/12; H02K 1/04; H02K 1/146; H02K 1/148; H02K 1/16
See application file for complete search history.

(56) References Cited

U.S. PATENT DOCUMENTS

| 2015/0115765 A1 | 4/2015 | Ko et al. |
| 2018/0076673 A1 | 3/2018 | Kazama et al. |
| 2022/0140687 A1 | 5/2022 | Hasegawa |

FOREIGN PATENT DOCUMENTS

| JP | 2011139549 A | * | 7/2011 |
| JP | 2017-200267 A | | 11/2017 |
| JP | 2018-027001 A | | 2/2018 |
| JP | 2020-141495 A | | 9/2020 |

\* cited by examiner

Primary Examiner — Bryan R Perez
(74) Attorney, Agent, or Firm — Paratus Law Group, PLLC

(57) ABSTRACT

An outer peripheral wall portion of an insulator has a plurality of slits that are formed to extend from one end in a direction of a central axis of the outer peripheral wall portion along the central axis and through which a winding wire drawn out from a winding portion is passed. The outer peripheral wall portion is formed with a connecting slit provided with a step portion by connecting two of the plurality of slits that are adjacent to each other in a circumferential direction of the outer peripheral wall portion, that extend from the one end, and that are different in depth.

11 Claims, 11 Drawing Sheets

IN CASE OF ONE-NOZZLE WINDING

IN CASE OF THREE-NOZZLE WINDING

IN CASE OF ONE-NOZZLE WINDING

INSULATOR AND MOTOR

CROSS REFERENCE TO PRIOR APPLICATION

This application is a National Stage Patent Application of PCT International Patent Application No. PCT/JP2021/034593 (filed on Sep. 21, 2021) under 35 U.S.C. § 371, which claims priority to Japanese Patent Application No. 2020-166376 (filed on Sep. 30, 2020), which are all hereby incorporated by reference in their entirety.

FIELD

The present invention relates to an insulator and a motor.

BACKGROUND

A known compressor motor includes a rotor, a stator disposed on the outer peripheral side of the rotor, and a tubular insulator provided at an axial end portion of the stator. In this type of motor, a winding wire is drawn out from a winding drum portion, which is formed by winding the winding wire around a teeth portion of the stator, the winding wire is a conducting wire, and the winding wire, which is stretched along the circumferential direction of the insulator, is wound around another teeth portion to form a winding portion.

The insulator includes an outer peripheral wall portion having a tubular shape, and the winding drum portion that is provided on the inner periphery of the outer peripheral wall portion to correspond to the teeth portion of the stator and around which the winding wire is wound. The outer peripheral wall portion of the insulator is formed with a plurality of slits, which extends toward the stator side from one end on the side opposite to the stator, and the winding wire, which is drawn out from the winding portion, is drawn out from the inner peripheral side to the outer peripheral side of the outer peripheral wall portion through each slit, and stretched along the outer peripheral surface of the outer peripheral wall portion.

CITATION LIST

Patent Literature

Patent Literature 1: JP 2020-141495 A

SUMMARY

Technical Problem

In a three-phase motor as a motor as described above, winding portions of respective phases are disposed in a certain order and phase by phase along the circumferential direction of a stator. In the process of manufacturing such a three-phase motor, a winding machine is used to supply a winding wire from a nozzle, wind the winding wire across a stator core teeth portion of a stator core and a winding drum portion of an insulator, and wind the winding wire along the outer peripheral wall portion of the insulator. In a case where each of the three-phase winding portions is formed using the winding machine, three-phase winding wires may be simultaneously wound using mutually operation-synchronized three nozzles to form the three-phase winding portions (hereinafter, referred to as three-nozzle winding) or the winding wires of respective phases may be wound phase by phase using a single nozzle to form the winding portions in order (hereinafter, referred to as one-nozzle winding).

FIG. 12 is a development view illustrating winding wires of respective phases wound by three-nozzle winding around an insulator of the related art in a nine-slot three-phase motor. FIG. 13 is a development view illustrating winding wires of respective phases wound by one-nozzle winding around the insulator of the related art in the nine-slot three-phase motor. FIGS. 12 and 13 are development views seen from the inner peripheral side of the insulator, the lower sides in the drawings are a lead side where a power wire (lead wire) is disposed, and the upper sides in the drawings are an anti-lead side opposite to the lead, which is the side that is opposite to a stator side. Here, the winding wire is wound counterclockwise (CCW) around each of the winding portions forming nine slots.

First, a case where the winding wire of each phase is wound by three-nozzle winding with respect to the insulator of the related art, will be described. As illustrated in FIG. 12, while forming each of winding portions 45 of U, V, and W phases with winding wires 46, the winding wires 46, which is drawn out from the winding portions 45, are respectively passed through slits 103 of an outer peripheral wall portion 102 of an insulator 101, and then a crossover part 49 of the winding wire 46 of each phase is stretched along an outer peripheral surface of the outer peripheral wall portion 102. For example, a U-phase crossover part 49-U, which extends from a U-phase winding wire 46-U, and a V-phase crossover part 49-V, which extends from a V-phase winding wire 46-V, are stretched over the outer peripheral wall portion 102 so as not to cross each other. In this manner, the crossover parts 49 of the respective phases are stretched at mutual intervals over the outer peripheral wall portion 102 of the insulator 101, and insulation distances are ensured between the winding wires 46 different in phase. Suppressed as a result is out-of-phase noise addition to an electric signal of each phase that drives the three-phase motor.

Next, a case where the winding wire 46 of each phase is wound by one-nozzle winding with respect to the insulator 101 of the related art used in three-nozzle winding as described above, will be described. FIG. 13 illustrates, as an example, a state where the winding wires of the respective phases are wound in the order of V, W, and U phases. As illustrated in FIG. 13, in a case where the winding wire 46 of each phase is wound by one-nozzle winding, when the U-phase winding wire 46-U, wound last among the three phases, is passed through the slit 103 and the U-phase crossover part 49-U is formed along the outer peripheral surface of the outer peripheral wall portion 102, the V-phase winding wire 46-V is extended and the U-phase crossover part 49-U rides on the V-phase crossover part 49-V stretched over the outer peripheral wall portion 102, which leads to a problem by generating a crossing portion 105 where crossover parts of two different phases cross each other. Although not illustrated, the crossing portion 105 is generated between the crossover parts 49 of two of the three phases even in a case where the winding wires 46 of the respective phases are wound in an order different from the order described above.

Therefore, when the winding wire 46 is stretched by one-nozzle winding with respect to an insulator used in three-nozzle winding, the crossing portion 105 is generated at the crossover part 49, and thus no insulation distance can be ensured between the winding wires 46 of the respective phases. Meanwhile, it is conceivable to avoid crossing portion generation in one-nozzle winding, by separately preparing a three-nozzle winding-only insulator and a one-nozzle winding-only insulator. However, in that case, two types of insulator molding dies are needed, one for three-nozzle winding only and the other for one-nozzle winding only, which leads to a problematic increase in manufacturing cost. In addition, the shapes of the three-nozzle winding-only insulator and the one-nozzle winding-only insulator are almost the same, which leads to the risk of using an insulator not to be used instead of an insulator to be used. In addition, in a case where it needs to switch between three-nozzle winding and one-nozzle winding in the process of manufacturing the three-phase motor, setup work becomes complicated and the cost of manufacturing the three-phase motor further increases.

The disclosed technique has been made in view of the above, and an object thereof is to provide an insulator and a motor with which the insulator can be shared for one-nozzle winding and three-nozzle winding.

Solution to Problem

According to an aspect of an embodiments in the present application, an insulator that is used in a three-phase motor where a winding portion formed by winding a winding wire is disposed along a circumferential direction of a stator having a tubular shape, and that is fixed to an end portion in a direction of a central axis of the stator, the insulator includes: an outer peripheral wall portion having a tubular shape; and a winding drum portion that is provided on an inner periphery of the outer peripheral wall portion and around which the winding wire is wound, wherein the outer peripheral wall portion has a plurality of slits that are formed to extend from one end in a direction of a central axis of the outer peripheral wall portion along the central axis and through which the winding wire, drawn out from the winding portion, is passed, and in the outer peripheral wall portion, a connecting slit is formed in which a step portion is provided by connecting two of the plurality of slits that are adjacent to each other in a circumferential direction of the outer peripheral wall portion, that extend from the one end, and that are different in depth.

Advantageous Effects of Invention

According to one aspect of the insulator that is disclosed in the present application, the insulator, formed with a three-phase winding portion, can be shared for both one-nozzle winding and three-nozzle winding.

DESCRIPTION OF EMBODIMENTS

Hereinafter, an example of an insulator and a motor disclosed in the present application, will be described in detail with reference to the drawings. It is noted that the following example does not limit the insulator and the motor disclosed in the present application.

Example

Figure 1:
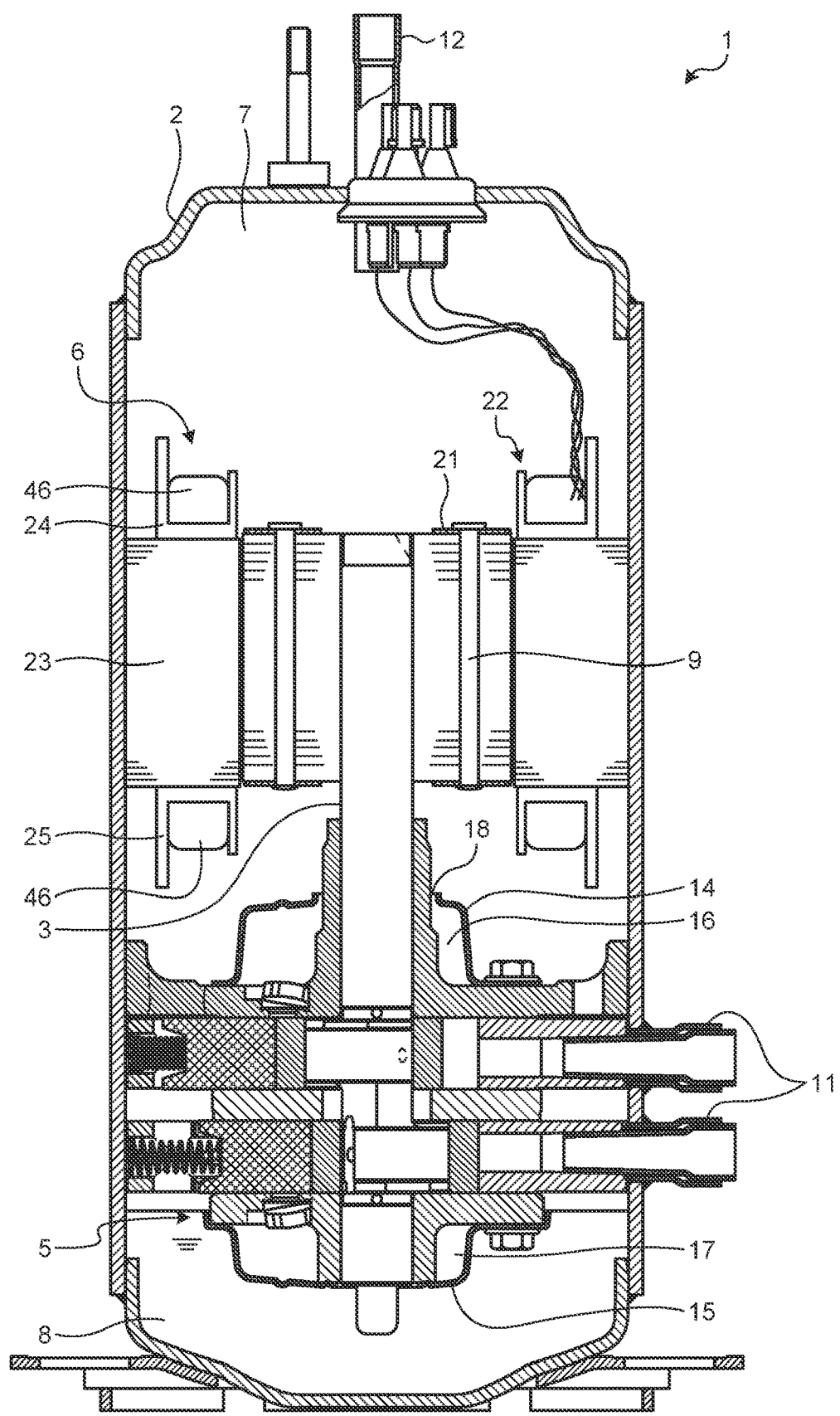
FIG. 1 is a longitudinal sectional view illustrating a compressor provided with a three-phase motor of an example.

FIG. 1 is a longitudinal sectional view illustrating a compressor provided with a three-phase motor of the example. As illustrated in FIG. 1, a compressor 1 is a so-called rotary compressor and includes a container 2, a rotating shaft 3, a compression unit 5, and a three-phase motor 6. The container 2 is formed of a metal material and forms a closed internal space 7. The internal space 7 is formed in a substantially columnar shape. The container 2 is formed such that a central axis of a column forming the internal space 7 is parallel to the vertical direction when the container 2 is vertically placed on a horizontal surface. An oil reservoir 8 is formed in a lower portion of the internal space 7 of the container 2. Refrigerating machine oil, which is lubricating oil for lubricating the compression unit 5, is stored in the oil reservoir 8. A suction pipe 11 for suctioning a refrigerant, and a discharge pipe 12 for discharging the compressed refrigerant, are connected to the container 2. The rotating shaft 3 as a rotating shaft is formed in a rod shape and is disposed in the internal space 7 of the container 2 such that one end thereof is disposed in the oil reservoir 8. The rotating shaft 3 is supported by the container 2 so as to be rotatable around the central axis of the column forming the internal space 7. The rotating shaft 3 rotates to supply the refrigerating machine oil, which is stored in the oil reservoir 8, to the compression unit 5.

The compression unit 5 is disposed in the lower portion of the internal space 7 and above the oil reservoir 8. The compressor 1 further includes an upper muffler cover 14 and a lower muffler cover 15. The upper muffler cover 14 is disposed in the upper portion of the compression unit 5 in the internal space 7. The upper muffler cover 14 forms an upper muffler chamber 16 inside. The lower muffler cover 15 is provided in the lower portion of the compression unit 5 in the internal space 7, and disposed in the upper portion of the oil reservoir 8. The lower muffler cover 15 forms a lower muffler chamber 17 inside. The lower muffler chamber 17 communicates with the upper muffler chamber 16 via a communication passage (not illustrated), which is formed in the compression unit 5. A compressed refrigerant discharge hole 18 is formed between the upper muffler cover 14 and the rotating shaft 3, and the upper muffler chamber 16 communicates with the internal space 7 via the compressed refrigerant discharge hole 18.

The compression unit 5 compresses the refrigerant that is supplied from the suction pipe 11 by the rotating shaft 3 rotating, and supplies the compressed refrigerant to the upper muffler chamber 16 and the lower muffler chamber 17. The refrigerant has compatibility with the refrigerating machine oil. The three-phase motor 6 is disposed in the upper portion of the compression unit 5 in the internal space 7.

Figure 2:
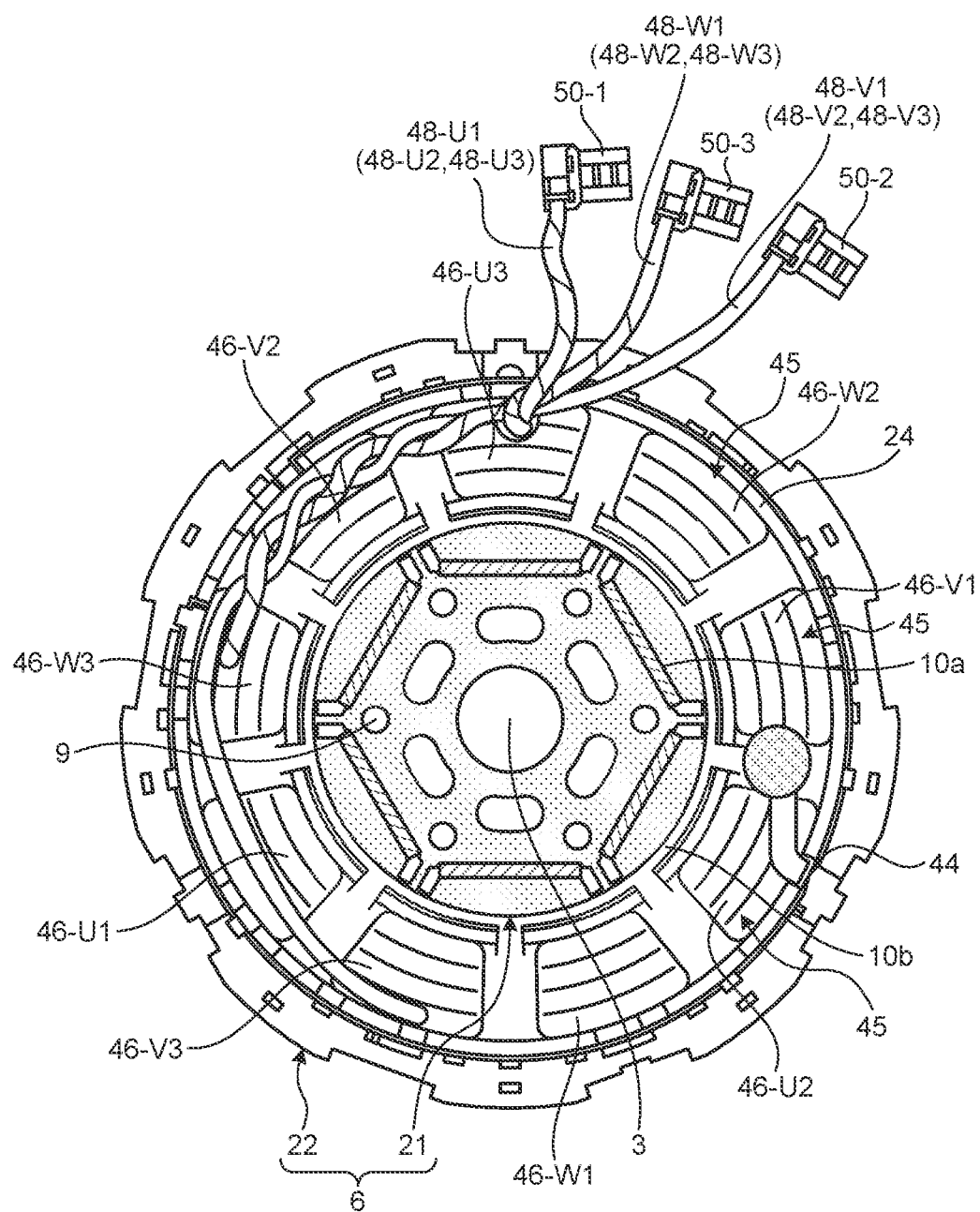
FIG. 2 is a plan view illustrating the three-phase motor of the example from an upper insulator side.

FIG. 2 is a plan view illustrating the three-phase motor 6 in the example from an upper insulator side. As illustrated in FIGS. 1 and 2, the three-phase motor 6 includes a rotor 21 and a stator 22. The rotor 21 is formed in a columnar shape by stacking a plurality of thin plates (magnetic bodies) of silicon steel and is integrated with a plurality of rivets 9. The rotating shaft 3 is inserted through the center of the rotor 21, and the rotor 21 is fixed to the rotating shaft 3. Six slit-shaped magnet embedding holes 10a are formed in the rotor 21 so as to form the respective sides of a hexagon with the rotating shaft 3 as the center. The magnet embedding holes 10a are formed at predetermined intervals in the circumferential direction of the rotor 21. A plate-shaped permanent magnet 10b is embedded in the magnet embedding hole 10a.

The stator 22 is formed in a substantially cylindrical shape, disposed so as to surround the rotor 21, and fixed to the container 2. The stator 22 includes a stator core 23, an upper insulator 24, a lower insulator 25, and a plurality of winding wires 46, which are conducting wires. The upper insulator 24 is fixed to the upper end portion of the stator core 23. The lower insulator 25 is fixed to the lower end portion of the stator core 23. The upper insulator 24 and the lower insulator 25 are examples of an insulating portion that insulates the stator core 23 and the winding wire 46 from each other.

Figure 3:
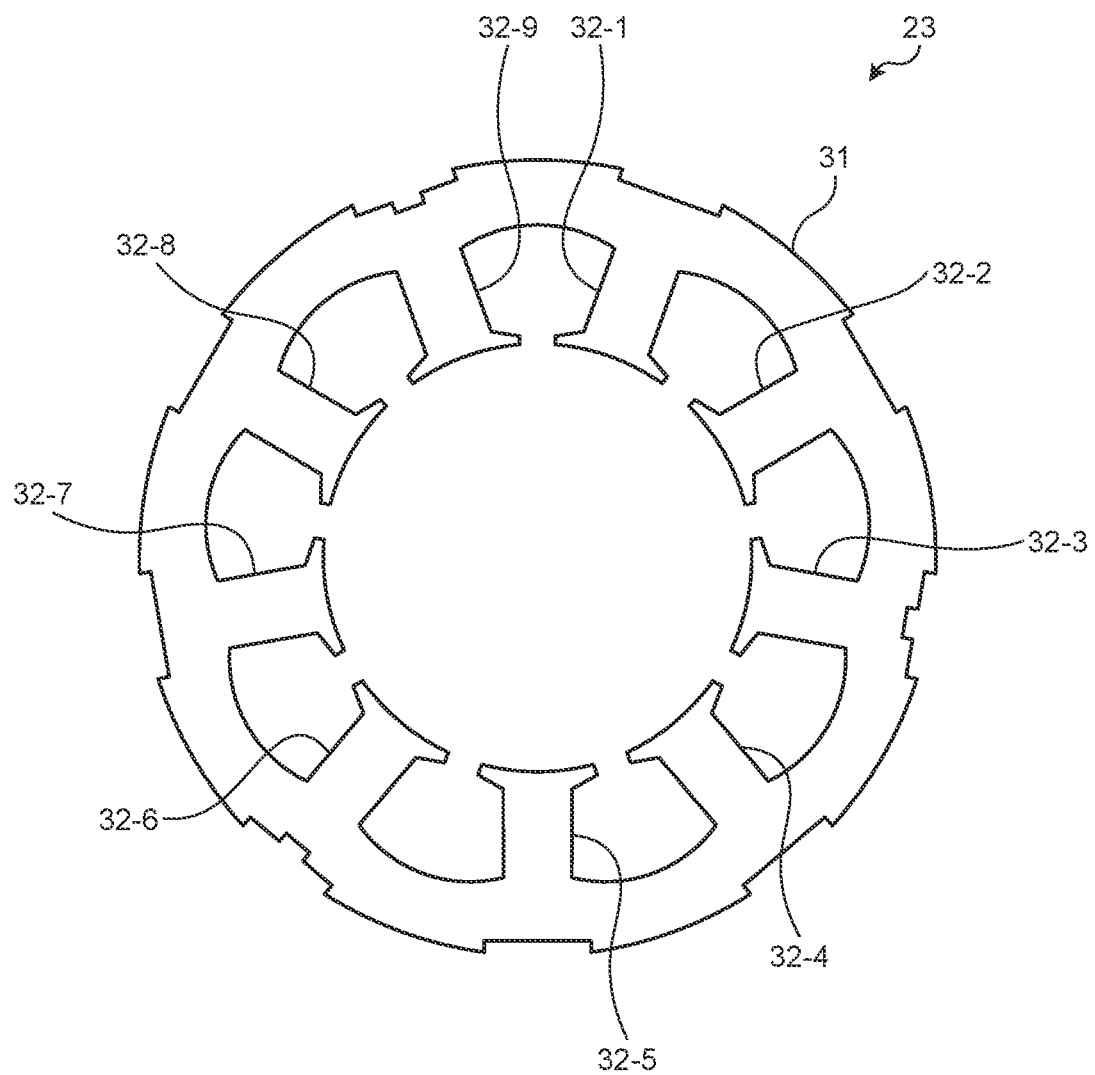
FIG. 3 is a bottom view illustrating a stator core in the example.

FIG. 3 is a bottom view illustrating the stator core 23 in the example. The stator core 23 is formed by stacking a plurality of plates formed of a soft magnetic body, for example, a silicon steel plate, and includes a yoke portion 31 and a plurality of stator core teeth portions 32-1 to 32-9 as illustrated in FIG. 3. The yoke portion 31 is formed in a substantially cylindrical shape. Of the plurality of stator core teeth portions 32-1 to 32-9, the first stator core teeth portion 32-1 is formed in a substantially columnar body shape. One end of the first stator core teeth portion 32-1 is formed continuously with an inner peripheral surface of the yoke portion 31, that is, formed so as to protrude from the inner peripheral surface of the yoke portion 31. Of the plurality of stator core teeth portions 32-1 to 32-9, the stator core teeth portions that are different from the first stator core teeth portion 32-1 are also formed in a substantially columnar body shape and protrude from the inner peripheral surface of the yoke portion 31 as in the case of the first stator core teeth portion 32-1. Further, in the case of a nine-slot stator, the plurality of stator core teeth portions 32-1 to 32-9 are formed on the inner peripheral surface of the yoke portion 31 at regular intervals of 40 degrees.

Figure 4:
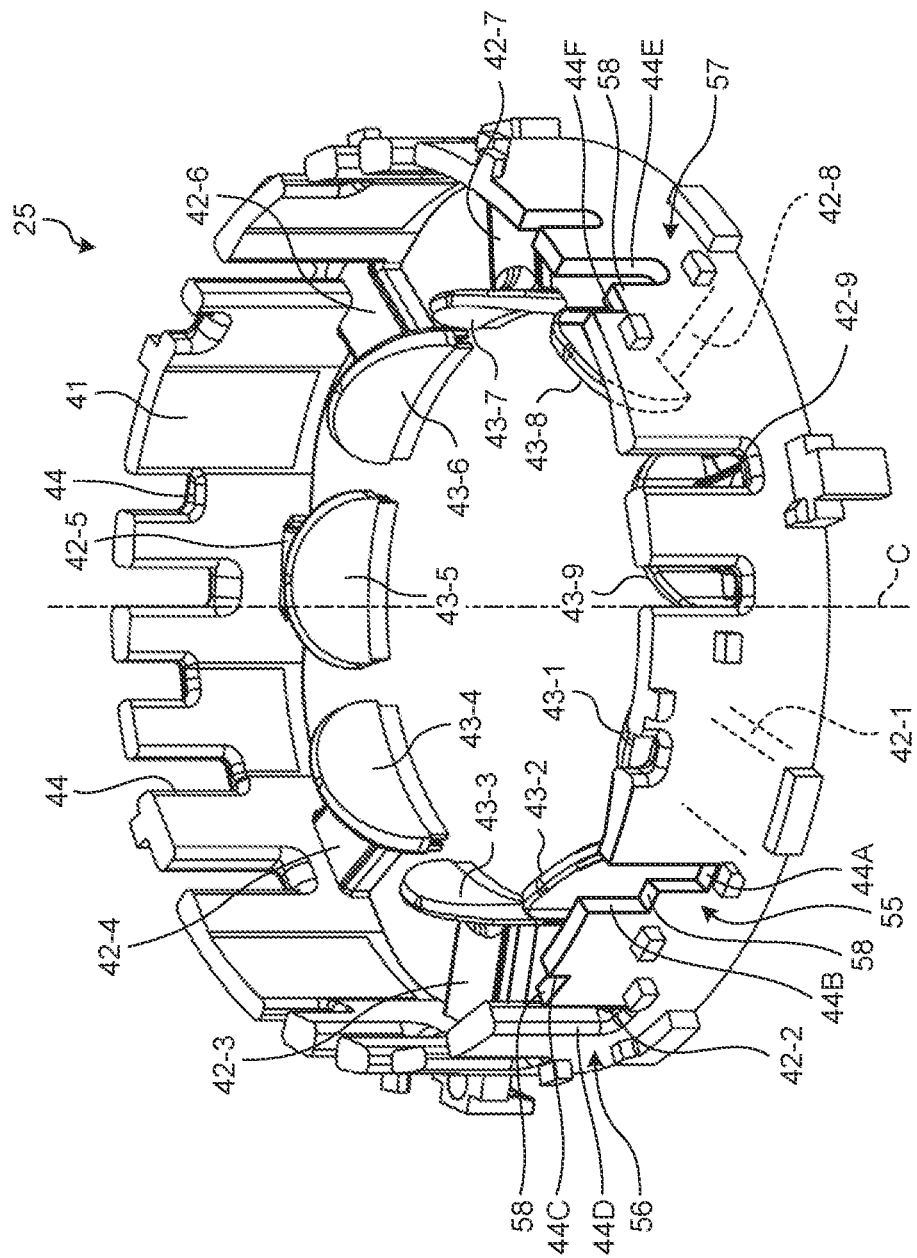
FIG. 4 is a perspective view illustrating a lower insulator in the example.

FIG. 4 is a perspective view illustrating the lower insulator 25 in the example. The lower insulator 25 is formed in a cylindrical shape and of an insulator, for example, polybutylene terephthalate resin (PBT). As illustrated in FIG. 4, the lower insulator 25 has an outer peripheral wall portion 41, a plurality of insulator teeth portions 42-1 to 42-9 as winding drum portions around which the winding wires 46 are wound, and a plurality of flange portions 43-1 to 43-9. The outer peripheral wall portion 41 is formed in a substantially cylindrical shape. In the outer peripheral wall portion 41, a plurality of slits 44, which extends along a central axis C from one end of the outer peripheral wall portion 41 in a direction of the central axis C (axial direction of the rotating shaft 3), are formed at intervals in a circumferential direction of the outer peripheral wall portion 41. In addition, in the outer peripheral wall portion 41, the other end of the outer peripheral wall portion 41 in the direction of the central axis C abuts against the stator core 23. In other words, the plurality of slits 44 are formed to extend toward the stator core 23 side (lead side) from one end of the outer peripheral wall portion 41 on the side opposite to the stator core 23 (anti-lead side). The winding wire 46 drawn out from a winding portion 45, which will be described later, is passed through each slit 44, and then the winding wire 46, which is drawn out from the inner peripheral side to the outer peripheral side of the outer peripheral wall portion 41, is stretched along an outer peripheral surface of the outer peripheral wall portion 41, and details of the plurality of slits 44 will be described later.

Of the plurality of insulator teeth portions 42-1 to 42-9, the first insulator teeth portion 42-1 is formed in a straight columnar body shape with a substantially semicircular section. One end of the first insulator teeth portion 42-1 is formed continuously with an inner peripheral surface of the outer peripheral wall portion 41, that is, formed so as to protrude from the inner peripheral surface of the outer peripheral wall portion 41. Of the plurality of insulator teeth portions 42-1 to 42-9, the insulator teeth portions, which are different from the first insulator teeth portion 42-1, are also formed in a straight columnar body shape and formed so as to protrude from the inner peripheral surface of the outer peripheral wall portion 41 as in the case of the first insulator teeth portion 42-1. The plurality of insulator teeth portions 42-1 to 42-9 are formed on the inner peripheral surface of the outer peripheral wall portion 41 at regular intervals of 40 degrees.

The plurality of flange portions 43-1 to 43-9 correspond to the plurality of insulator teeth portions 42-1 to 42-9, and are formed in a substantially semicircular plate shape, respectively. Of the plurality of flange portions 43-1 to 43-9, the first flange portion 43-1 corresponding to the first insulator teeth portion 42-1 is continuous with the other end of the first insulator teeth portion 42-1, and is formed integrally with the first insulator teeth portion 42-1. Of the plurality of flange portions 43-1 to 43-9, the flange portions, which are different from the first flange portion 43-1, are also continuous with the other ends of the plurality of insulator teeth portions 42-2 to 42-9, and are formed integrally with the respective insulator teeth portions 42-2 to 42-9 as in the case of the first flange portion 43-1.

Although the lower insulator 25 has been described here, the upper insulator 24 is also formed in the same manner as the lower insulator 25. In other words, the upper insulator 24 is formed of an insulator in a cylindrical shape and has the outer peripheral wall portion 41, the plurality of insulator teeth portions 42-1 to 42-9, and the plurality of flange portions 43-1 to 43-9.

Figure 5:
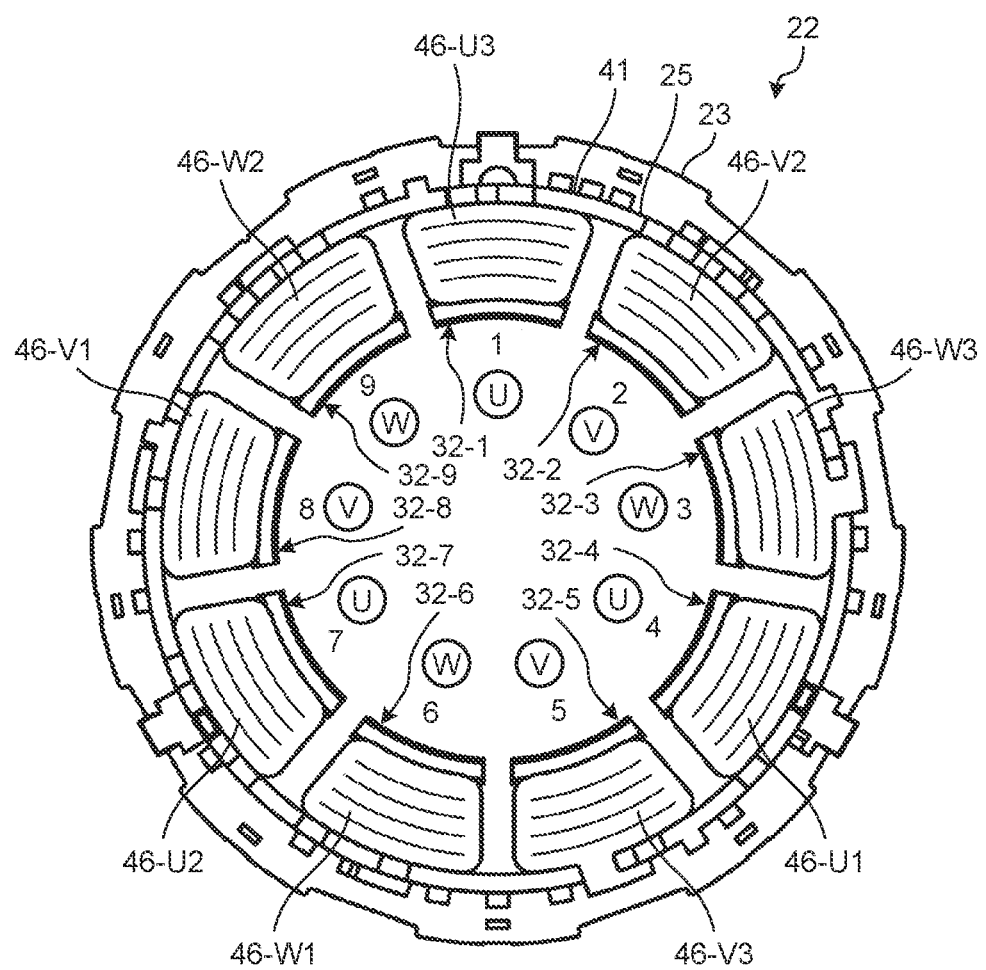
FIG. 5 is a bottom view illustrating a stator in the example.
Figure 6:
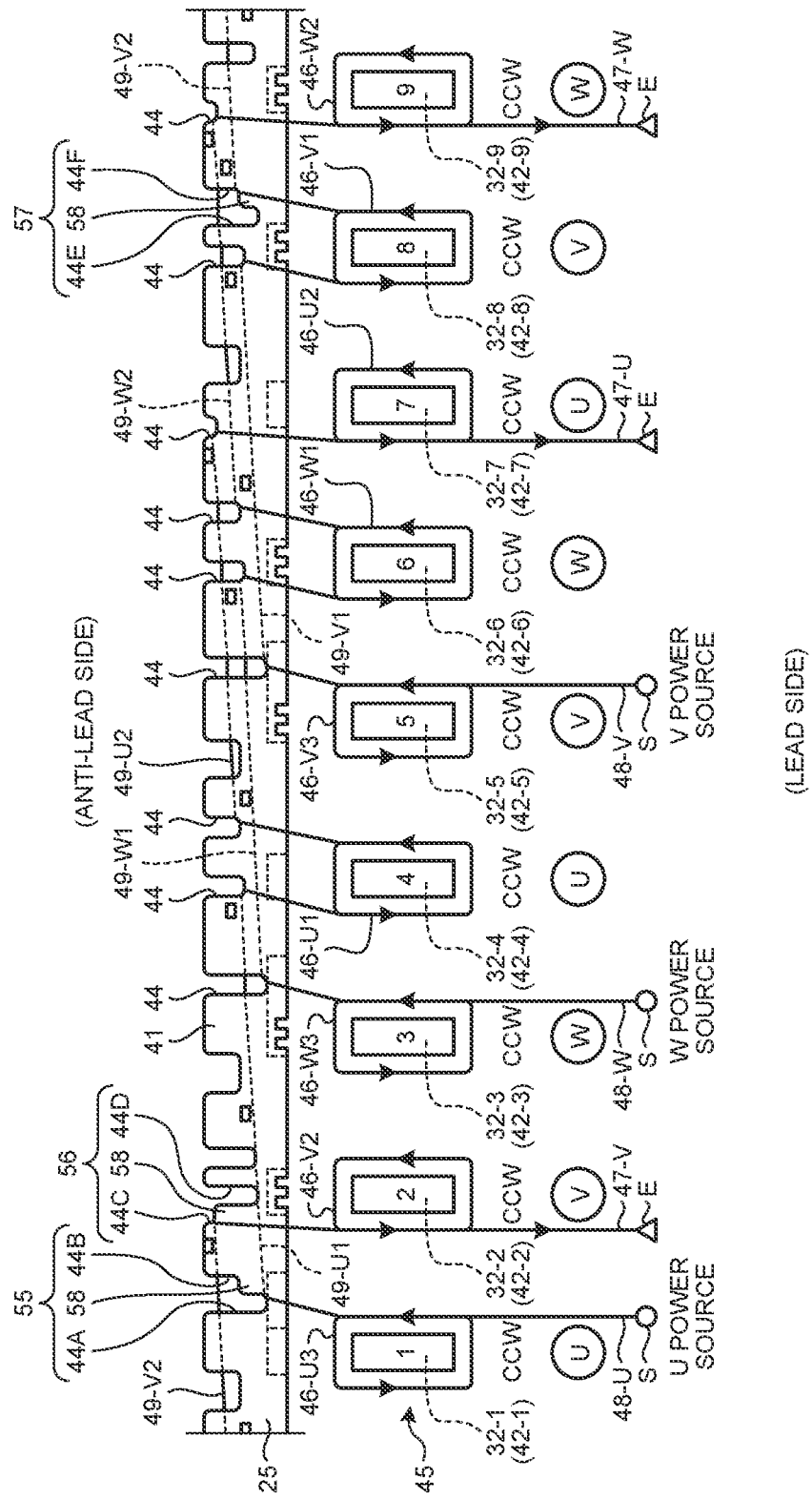
FIG. 6 is a development view illustrating a winding wire of each phase wound by three-nozzle winding with respect to the lower insulator in the example.

FIG. 5 is a bottom view illustrating the stator 22 in the example. As illustrated in FIG. 5, the plurality of winding wires 46 are wound around the plurality of stator core teeth portions 32-1 to 32-9 of the stator core 23, respectively. As illustrated in FIG. 6, which will be described later, the winding portions 45 are respectively formed by the winding wires 46 in the stator core teeth portions 32-1 to 32-9. In FIG. 5, each of the winding portions 45 forming nine slots, is indicated by reference numerals 1 to 9 in clockwise order in the drawing. The three-phase motor 6 in the embodiment is a six-pole and nine-slot concentrated winding motor (see FIG. 2). The plurality of winding wires 46 include a plurality of U-phase winding wires 46-U1 to 46-U3 forming the U-phase winding portion 45, a plurality of V-phase winding wires 46-V1 to 46-V3 forming the V-phase winding portion 45, and a plurality of W-phase winding wires 46-W1 to 46-W3 forming the W-phase winding portion 45.

It is noted that the motor of the present invention is not limited to nine-slot, and the number of slots, that is, the number of winding portions 45 may be nine or more and a multiple of three. In other words, the number of insulator teeth portions 42 of the lower insulator 25 (upper insulator 24) may be nine or more and a multiple of three.

The U-phase winding wire includes the plurality of winding wires 46. Specifically, the first U-phase winding wire 46-U1, the second U-phase winding wire 46-U2, and the third U-phase winding wire 46-U3 are provided as the U-phase winding wire. The first U-phase winding wire 46-U1 is wound around the fourth stator core teeth portion 32-4. The second U-phase winding wire 46-U2 is wound around the seventh stator core teeth portion 32-7. The third U-phase winding wire 46-U3 is wound around the first stator core teeth portion 32-1.

The V-phase winding wire includes the plurality of winding wires 46. Specifically, the first V-phase winding wire 46-V1, the second V-phase winding wire 46-V2, and the third V-phase winding wire 46-V3 are provided as the V-phase winding wire. The first V-phase winding wire 46-V1 is wound around the eighth stator core teeth portion 32-8. The second V-phase winding wire 46-V2 is wound around the second stator core teeth portion 32-2. The third V-phase winding wire 46-V3 is wound around the fifth stator core teeth portion 32-5.

The W-phase winding wire includes the plurality of winding wires 46. Specifically, the first W-phase winding wire 46-W1, the second W-phase winding wire 46-W2, and the third W-phase winding wire 46-W3 are provided as the W-phase winding wire. The first W-phase winding wire 46-W1 is wound around the sixth stator core teeth portion 32-6. The second W-phase winding wire 46-W2 is wound around the ninth stator core teeth portion 32-9. The third W-phase winding wire 46-W3 is wound around the third stator core teeth portion 32-3.

The third U-phase winding wire 46-U3 is wound around the first stator core teeth portion 32-1, together with the first insulator teeth portion 42-1 of the lower insulator 25, the first insulator teeth portion 42-1 of the upper insulator 24, and the insulating film (not illustrated) that is disposed between the insulators 24 and 25. Therefore, the third U-phase winding wire 46-U3 is appropriately insulated from the first stator core teeth portion 32-1 by the upper insulator 24 and the lower insulator 25, and is appropriately insulated from the stator core 23. Further, the third U-phase winding wire 46-U3 is wound so as to be sandwiched between the first flange portion 43-1 of the lower insulator 25 and the outer peripheral wall portion 41, and is wound so as to be sandwiched between the first flange portion 43-1 of the upper insulator 24 and the outer peripheral wall portion 41. Therefore, the upper insulator 24 and the lower insulator 25 prevent the third U-phase winding wire 46-U3 from deviating from the rotor 21 side from the first stator core teeth portion 32-1, which is so-called winding spillage.

Of the plurality of winding wires 46, the other winding wires 46, which are different from the third U-phase winding wire 46-U3, are also appropriately insulated from the stator core 23 by the upper insulator 24 and the lower insulator 25, and winding spillage is prevented.

The lower insulator 25 in this example is formed on the premise that the winding wire 46 is wound by both three-nozzle winding and one-nozzle winding. First, here, the lower insulator 25 in a state where the winding wire 46 is wound by three-nozzle winding, will be described. The lower insulator 25 in a state where the winding wire 46 is wound by one-nozzle winding, will be described later.

FIG. 6 is a development view illustrating the winding wire 46 of each phase wound by three-nozzle winding with respect to the lower insulator 25 in the example. FIG. 6 is a development view seen from the inner peripheral side of the lower insulator 25. The lower side in FIG. 6 is the lead side where a power wire (lead wire), connected to the winding wire 46, is disposed, and is the stator 22 side. The upper side in FIG. 6 is the anti-lead side opposite to the lead side, and is the side opposite to the stator 22 side. In addition, in FIG. 6, each of the winding portions 45 forming nine slots is indicated by reference numerals 1 to 9 in order from the left end to the right end in the drawing. A starting end S of the power wire, which is connected to a power source (not illustrated) disposed outside the compressor 1, is indicated by a circle mark, and a terminal end E of the power wire is indicated by a triangle mark.

As illustrated in FIG. 6, the first U-phase winding wire 46-U1 is wound counterclockwise (CCW) around the fourth stator core teeth portion 32-4. The second U-phase winding wire 46-U2 is wound counterclockwise around the seventh stator core teeth portion 32-7. The third U-phase winding wire 46-U3 is wound counterclockwise around the first stator core teeth portion 32-1. The first V-phase winding wire 46-V1 is wound counterclockwise around the eighth stator core teeth portion 32-8. The second V-phase winding wire 46-V2 is wound counterclockwise around the second stator core teeth portion 32-2. The third V-phase winding wire 46-V3 is wound counterclockwise around the fifth stator core teeth portion 32-5. The first W-phase winding wire 46-W1 is wound counterclockwise around the sixth stator core teeth portion 32-6. The second W-phase winding wire 46-W2 is wound counterclockwise around the ninth stator core teeth portion 32-9. The third W-phase winding wire 46-W3 is wound counterclockwise around the third stator core teeth portion 32-3. In this manner, the winding wires 46 are wound counterclockwise around all of the three-phase winding portions 45. It is noted that this example is not limited to the structure in which the winding wires 46 in the three-phase winding portions 45 are wound counterclockwise. The main part of the structure of the lower insulator 25 in this example will be described later.

The stator 22 further includes a U-phase neutral wire 47-U, a V-phase neutral wire 47-V, and a W-phase neutral wire 47-W. The U-phase neutral wire 47-U, the V-phase neutral wire 47-V, and the W-phase neutral wire 47-W are parts on the terminal end E side of the power wire. The U-phase neutral wire 47-U, the V-phase neutral wire 47-V, and the W-phase neutral wire 47-W are disposed on the upper insulator 24 side farther from the lower insulator 25 than the plurality of stator core teeth portions 32-1 to 32-9. It is noted that the lead side, which is the power wire, is also disposed on the upper insulator 24 side and thus, hereinafter in this specification, the upper insulator 24 side will also be referred to as the lead side.

One end of the U-phase neutral wire 47-U is electrically connected to the second U-phase winding wire 46-U2. One end of a the U-phase neutral wire 47-U is disposed in the seventh stator core teeth portion 32-7, and the other end is disposed on the lead side of the seventh stator core teeth portion 32-7. One end of the V-phase neutral wire 47-V is electrically connected to the second V-phase winding wire 46-V2. One end of the V-phase neutral wire 47-V is disposed in the second stator core teeth portion 32-2, and the other end is disposed on the lead side of the second stator core teeth portion 32-2. One end of the W-phase neutral wire 47-W is electrically connected to the first W-phase winding wire 46-W1. One end of the W-phase neutral wire 47-W is disposed in the ninth stator core teeth portion 32-9, and the other end is disposed on the lead side of the ninth stator core teeth portion 32-9.

The stator 22 further includes a U-phase power wire 48-U, a V-phase power wire 48-V, and a W-phase power wire 48-W. As for the U-phase power wire 48-U, one end that is the starting end S, is disposed on the lead side of the first stator core teeth portion 32-1. The other end of the U-phase power wire 48-U is electrically connected to the third U-phase winding wire 46-U3, wound around the first stator core teeth portion 32-1.

The U-phase power wire 48-U includes a first U-phase crossover part 49-U1, where a part drawn out from the third U-phase winding wire 46-U3 is drawn out from the inner peripheral side of the outer peripheral wall portion 41 of the lower insulator 25 to the outer peripheral side of the outer peripheral wall portion 41 through the slit 44. The first U-phase crossover part 49-U1 is disposed so as to be along the outer peripheral surface of the outer peripheral wall portion 41 of the lower insulator 25. In addition, the first U-phase crossover part 49-U1 is drawn in from the outer peripheral side to the inner peripheral side of the outer peripheral wall portion 41 through the slit 44, and connected to the first U-phase winding wire 46-U1 wound around the fourth stator core teeth portion 32-4.

Subsequently, the U-phase power wire 48-U includes a second U-phase crossover part 49-U2, where a part drawn out from the first U-phase winding wire 46-U1 is drawn out from the inner peripheral side of the outer peripheral wall portion 41 of the lower insulator 25 to the outer peripheral side of the outer peripheral wall portion 41 through the slit 44. The second U-phase crossover part 49-U2 is disposed so as to be along the outer peripheral surface of the outer peripheral wall portion 41 of the lower insulator 25. In addition, the second U-phase crossover part 49-U2 is drawn in from the outer peripheral side to the inner peripheral side of the outer peripheral wall portion 41 through the slit 44, and connected to the second U-phase winding wire 46-U2 wound around the seventh stator core teeth portion 32-7. In addition, the U-phase power wire 48-U includes the U-phase neutral wire 47-U drawn out from the second U-phase winding wire 46-U2 and electrically connected to the terminal end E.

As for the V-phase power wire 48-V, one end that is the starting end S, is disposed on the lead side of the fifth stator core teeth portion 32-5. The other end of the V-phase power wire 48-V is electrically connected to the third V-phase winding wire 46-V3 wound around the fifth stator core teeth portion 32-5. The V-phase power wire 48-V includes a first V-phase crossover part 49-V1, where a part drawn out from the third V-phase winding wire 46-V3 is drawn out from the inner peripheral side of the outer peripheral wall portion 41 of the lower insulator 25 to the outer peripheral side of the outer peripheral wall portion 41 through the slit 44. The first V-phase crossover part 49-V1 is disposed so as to be along the outer peripheral surface of the outer peripheral wall portion 41 of the lower insulator 25. In addition, the first V-phase crossover part 49-V1 is drawn in from the outer peripheral side to the inner peripheral side of the outer peripheral wall portion 41 through the slit 44, and connected to the first V-phase winding wire 46-V1 wound around the eighth stator core teeth portion 32-8.

Subsequently, the V-phase power wire 48-V includes a second V-phase crossover part 49-V2, where a part drawn out from the first V-phase winding wire 46-V1 is drawn out from the inner peripheral side of the outer peripheral wall portion 41 of the lower insulator 25 to the outer peripheral side of the outer peripheral wall portion 41 through the slit 44. The second V-phase crossover part 49-V2 is disposed so as to be along the outer peripheral surface of the outer peripheral wall portion 41 of the lower insulator 25. In addition, the second V-phase crossover part 49-V2 is drawn in from the outer peripheral side to the inner peripheral side of the outer peripheral wall portion 41 through the slit 44, and connected to the second V-phase winding wire 46-V2 wound around the second stator core teeth portion 32-2. In addition, the V-phase power wire 48-V includes the V-phase neutral wire 47-V drawn out from the second V-phase winding wire 46-V2 and electrically connected to the terminal end E.

As for the W-phase power wire 48-W, one end that is the starting end S is disposed on the lead side of the third stator core teeth portion 32-3. The other end of the W-phase power wire 48-W is electrically connected to the third W-phase winding wire 46-W3 wound around the third stator core teeth portion 32-3. The W-phase power wire 48-W includes a first W-phase crossover part 49-W1, where a part drawn out from the third W-phase winding wire 46-W3 is drawn out from the inner peripheral side of the outer peripheral wall portion 41 of the lower insulator 25 to the outer peripheral side of the outer peripheral wall portion 41 through the slit 44. The first W-phase crossover part 49-W1 is disposed so as to be along the outer peripheral surface of the outer peripheral wall portion 41 of the lower insulator 25. In addition, the first W-phase crossover part 49-W1 is drawn in from the outer peripheral side to the inner peripheral side of the outer peripheral wall portion 41 through the slit 44, and connected to the first W-phase winding wire 46-W1 wound around the sixth stator core teeth portion 32-6.

Subsequently, the W-phase power wire 48-W includes a second W-phase crossover part 49-W2, where a part drawn out from the first W-phase winding wire 46-W1 is drawn out from the inner peripheral side of the outer peripheral wall portion 41 of the lower insulator 25 to the outer peripheral side of the outer peripheral wall portion 41 through the slit 44. The second W-phase crossover part 49-W2 is disposed so as to be along the outer peripheral surface of the outer peripheral wall portion 41 of the lower insulator 25. In addition, the second W-phase crossover part 49-W2 is drawn in from the outer peripheral side to the inner peripheral side of the outer peripheral wall portion 41 through the slit 44, and connected to the second W-phase winding wire 46-W2 wound around the ninth stator core teeth portion 32-9. In addition, the W-phase power wire 48-W includes the W-phase neutral wire 47-W drawn out from the second W-phase winding wire 46-W2 and electrically connected to the terminal end E.

Figure 7:
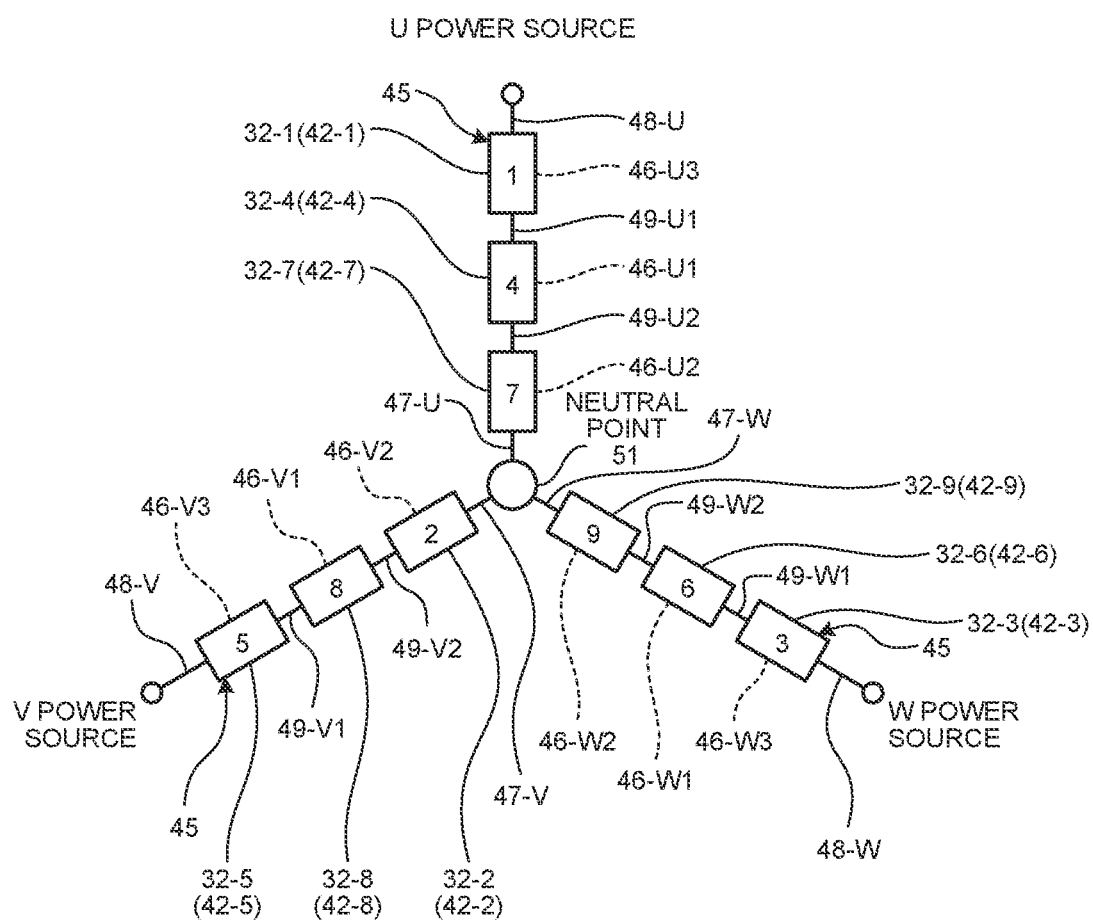
FIG. 7 is a connection diagram illustrating the connection state of the winding wires of the respective phases in the example.

FIG. 7 is a connection diagram illustrating the connection state of the winding wires 46 of the respective phases in the example. The three-phase motor in the embodiment is a motor that has a star connection in which the winding wires 46 are connected in series. In FIG. 7 as well, each of the winding portions 45 forming nine slots is indicated by reference numerals 1 to 9 corresponding to those in FIGS. 5 and 6. The stator 22 includes a neutral point 51 as illustrated in FIG. 7. Each of the U-phase neutral wire 47-U, the V-phase neutral wire 47-V, and the W-phase neutral wire 47-W is electrically connected to the neutral point 51.

[Stator Manufacturing Method]

Here, a case of manufacturing the stator 22 by winding the winding wires 46 by three-nozzle winding using a winding machine having mutually operation-synchronized three nozzles, will be described as an example. By using the winding machine in which the operations of the three nozzles are synchronized, U-phase, V-phase, and W-phase conducting wires are simultaneously wound in a predetermined winding manner with respect to the stator core 23 to which the upper insulator 24 and the lower insulator 25 are attached, and a total of three winding portions 45, one winding portion 45 for each phase, are simultaneously formed. The stator 22 is manufactured by forming three winding portions 45 at a time and forming a total of nine winding portions 45 in this manner. An enameled wire (electric wire in which a copper wire is covered with an enamel coating) or the like is used as the conducting wire that is the winding wire 46.

The winding machine for three-nozzle winding includes U-phase conducting wire nozzle, V-phase conducting wire nozzle, and W-phase conducting wire nozzle. In the winding machine for three-nozzle winding, one nozzle is disposed every 120 degrees in a circumferential direction of the central axis C so as to be axially symmetrical with respect to the central axis C. By the winding machine for three-nozzle winding, the three nozzles (V-phase conducting wire nozzle, W-phase conducting wire nozzle, and U-phase conducting wire nozzle) are synchronously moved axisymmetrically with respect to the central axis C. Then, by moving the U-phase conducting wire nozzle such that the U-phase conducting wire nozzle performs a predetermined operation, the U-phase conducting wire is wound at a predetermined position with respect to the stator core 23. Likewise, by moving the V-phase conducting wire nozzle such that the V-phase conducting wire nozzle performs a predetermined operation, the V-phase conducting wire is wound at a predetermined position with respect to the stator core 23. By moving the W-phase conducting wire nozzle such that the W-phase conducting wire nozzle performs a predetermined operation, the W-phase conducting wire is wound at a predetermined position with respect to the stator core 23.

First, the winding machine is set with the upper insulator 24, the lower insulator 25, and the stator core 23 to which an insulating film (not illustrated) is attached. By moving the U-phase conducting wire nozzle, the winding machine disposes the starting end S, which is one end of the U-phase conducting wire, on the lead side of the first stator core teeth portion 32-1 to cause extension from the starting end S as the U-phase power wire 48-U. At the same time, the winding machine disposes the starting end S, which is one end of the V-phase conducting wire, on the lead side of the fifth stator core teeth portion 32-5 to cause extension from the starting end S as the V-phase power wire 48-V, by moving the V-phase conducting wire nozzle, and disposes the starting end S, which is one end of the W-phase conducting wire, on the lead side of the third stator core teeth portion 32-3 to cause extension from the starting end S as the W-phase power wire 48-W by moving the W-phase conducting wire nozzle.

The winding machine forms the third U-phase winding wire 46-U3 with the U-phase conducting wire by winding the U-phase conducting wire, which is extended from the starting end S, counterclockwise around the first stator core teeth portion 32-1. At this time, the winding machine winds the V-phase conducting wire, which is extended from the starting end S, counterclockwise around the fifth stator core teeth portion 32-5, and forms the third V-phase winding wire 46-V3 with the V-phase conducting wire by moving the V-phase conducting wire nozzle in synchronization with the U-phase conducting wire nozzle. The winding machine winds the W-phase conducting wire, which is extended from the starting end S, counterclockwise around the third stator core teeth portion 32-3, and forms the third W-phase winding wire 46-W3 with the W-phase conducting wire by moving the W-phase conducting wire nozzle in synchronization with the U-phase conducting wire nozzle.

Next, the winding machine moves the U-phase conducting wire nozzle to pass the U-phase conducting wire, which is extended from the third U-phase winding wire 46-U3, through the slit 44 of the outer peripheral wall portion 41, and forms the first U-phase crossover part 49-U1 with the U-phase conducting wire by causing the U-phase conducting wire drawn out from the inner peripheral side to the outer peripheral side of the outer peripheral wall portion 41 to be along the outer peripheral surface of the outer peripheral wall portion 41. Subsequently, the winding machine moves the U-phase conducting wire nozzle to pass the U-phase conducting wire, which is extended from the first U-phase crossover part 49-U1, through the slit 44, and forms the first U-phase winding wire 46-U1 with the U-phase conducting wire by winding the U-phase conducting wire drawn in from the outer peripheral side to the inner peripheral side of the outer peripheral wall portion 41 counterclockwise around the fourth stator core teeth portion 32-4.

At this time, the first V-phase crossover part 49-V1 is formed by the V-phase conducting wire extended from the third V-phase winding wire 46-V3 and, at the same time, the first W-phase crossover part 49-W1 is formed by the W-phase conducting wire extending from the third W-phase winding wire 46-W3. Likewise, by moving the V-phase conducting wire nozzle in synchronization with the U-phase conducting wire nozzle, the winding machine for three-nozzle winding passes the V-phase conducting wire, which is extended from the first V-phase crossover part 49-V1, through the slit 44 to wind the V-phase conducting wire counterclockwise around the eighth stator core teeth portion 32-8, and forms the first V-phase winding wire 46-V1 with the V-phase conducting wire. By moving the W-phase conducting wire nozzle in synchronization with the U-phase conducting wire nozzle, the winding machine passes the W-phase conducting wire, which is extended from the first W-phase crossover part 49-W1, through the slit 44 to wind the W-phase conducting wire counterclockwise around the sixth stator core teeth portion 32-6, and forms the first W-phase winding wire 46-W1 with the W-phase conducting wire.

Next, the winding machine moves the U-phase conducting wire nozzle to pass the U-phase conducting wire, which is extending from the first U-phase winding wire 46-U1, through the slit 44 of the outer peripheral wall portion 41, and forms the second U-phase crossover part 49-U2 with the U-phase conducting wire by causing the U-phase conducting wire drawn out from the inner peripheral side to the outer peripheral side of the outer peripheral wall portion 41 to be along the outer peripheral surface of the outer peripheral wall portion 41. Subsequently, the winding machine moves the U-phase conducting wire nozzle to pass the U-phase conducting wire, which is extended from the second U-phase crossover part 49-U2, through the slit 44, and forms the second U-phase winding wire 46-U2 with the U-phase conducting wire by winding the U-phase conducting wire drawn in from the outer peripheral side to the inner peripheral side of the outer peripheral wall portion 41 counterclockwise around the seventh stator core teeth portion 32-7.

At this time, by moving the V-phase conducting wire nozzle and the W-phase conducting wire nozzle in synchronization with the U-phase conducting wire nozzle, the winding machine forms the second V-phase crossover part 49-V2 with the V-phase conducting wire extending from the first V-phase winding wire 46-V1 and, at the same time, forms the second W-phase crossover part 49-W2 with the W-phase conducting wire extending from the first W-phase winding wire 46-W1. Likewise, by moving the V-phase conducting wire nozzle in synchronization with the U-phase conducting wire nozzle, the winding machine passes the V-phase conducting wire, which is extended from the second V-phase crossover part 49-V2, through the slit 44 to wind the V-phase conducting wire counterclockwise around the second stator core teeth portion 32-2, and forms the second V-phase winding wire 46-V2 with the V-phase conducting wire. By moving the W-phase conducting wire nozzle in synchronization with the U-phase conducting wire nozzle, the winding machine passes the W-phase conducting wire, which is extended from the second W-phase crossover part 49-W2, through the slit 44 to wind the W-phase conducting wire counterclockwise around the ninth stator core teeth portion 32-9, and forms the second W-phase winding wire 46-W2 with the W-phase conducting wire.

By manufacturing the stator 22 in this manner, the first U-phase crossover part 49-U1, the second U-phase crossover part 49-U2, the first V-phase crossover part 49-V1, the second V-phase crossover part 49-V2, the first W-phase crossover part 49-W1, and the second W-phase crossover part 49-W2 respectively stretched over the outer peripheral surface of the outer peripheral wall portion 41, are inclined upward to the right in FIG. 6 with respect to the circumferential direction of the outer peripheral wall portion 41, and stretched over the outer peripheral surface at mutual intervals. As a result, insulation distances can be ensured between the crossover parts 49 of the respective phases, as compared with a case where the crossover parts are horizontally stretched with respect to the axial direction of the central axis C.

Finally, by moving the U-phase conducting wire nozzle, the winding machine disposes the terminal end E, which is the other end of the U-phase conducting wire, on the lead side of the seventh stator core teeth portion 32-7 to form the U-phase neutral wire 47-U. At this time, by moving the V-phase conducting wire nozzle and the W-phase conducting wire nozzle in synchronization with the U-phase conducting wire nozzle, the winding machine disposes the terminal end E, which is the other end of the V-phase conducting wire, on the lead side of the second stator core teeth portion 32-2 to form the V-phase neutral wire 47-V, and disposes the terminal end E, which is the other end of the W-phase conducting wire, on the lead side of the ninth stator core teeth portion 32-9 to form the W-phase neutral wire 47-W. In addition, the end of the U-phase neutral wire 47-U, the end of the V-phase neutral wire 47-V, and the end of the W-phase neutral wire 47-W are electrically connected by a connector (not illustrated).

Although a case of winding the winding wires 46 by three-nozzle winding using the winding machine equipped with three nozzles, has been described above, the winding wires 46 can also be wound by one-nozzle winding using a winding machine equipped with only one nozzle. In this case, the U-phase conducting wire, V-phase conducting wire, and W-phase conducting wire are wound phase by phase in a predetermined order, and the three-phase winding portions 45 are formed phase by phase. The stator 22 is manufactured by forming the three-phase winding portions 45 in this manner.

[Operation of Compressor]

The compressor 1 is provided as a component of a refrigeration cycle apparatus (not illustrated), and is used so that a refrigerant is compressed and the refrigerant is circulated in a refrigerant circuit of the refrigeration cycle apparatus. The three-phase motor 6 generates a rotating magnetic field by three-phase voltages being respectively applied to a plurality of U-phase power wires 48-U1 to 48-U3, a plurality of V-phase power wires 48-V1 to 48-V3, and a plurality of W-phase power wires 48-W1 to 48-W3. The rotor 21 is rotated by the rotating magnetic field generated by the stator 22. The three-phase motor 6 rotates the rotating shaft 3 by the rotor 21 rotating.

The compression unit 5 suctions low-pressure refrigerant gas via the suction pipe 11 by the rotating shaft 3 rotating, compresses the suctioned low-pressure refrigerant gas to generate high-pressure refrigerant gas, and supplies the high-pressure refrigerant gas to the upper muffler chamber 16 and the lower muffler chamber 17. The lower muffler cover 15 reduces the pulsation of the pressure of the high-pressure refrigerant gas supplied to the lower muffler chamber 17, and supplies the pressure pulsation-reduced high-pressure refrigerant gas to the upper muffler chamber 16. The upper muffler cover 14 reduces the pulsation of the pressure of the high-pressure refrigerant gas supplied to the upper muffler chamber 16, and supplies the pressure pulsation-reduced high-pressure refrigerant gas via the compressed refrigerant discharge hole 18 to the space between the compression unit 5 and the three-phase motor 6 in the internal space 7.

The high-pressure refrigerant gas, which is supplied to the space between the compression unit 5 and the three-phase motor 6 in the internal space 7, is supplied to the space above the three-phase motor 6 in the internal space 7 by passing through the gap that is formed in the three-phase motor 6. The refrigerant, which is supplied to the space above the three-phase motor 6 in the internal space 7, is discharged via the discharge pipe 12 to the device that is disposed on the downstream side of the compressor 1 in the refrigeration cycle apparatus.

[Characteristic Structure of Three-Phase Motor]

Next, the characteristic structure of the three-phase motor 6 in the example will be described. The features of this example include the structure of the plurality of slits 44, which is formed in the outer peripheral wall portion 41 of the lower insulator 25. Although the lower insulator 25 will be described below, the same applies to the upper insulator 24.

The lower insulator 25 of the example has a structure in which a part of the plurality of slits 44 allows selective passage of the winding wire 46 in the cases of three-nozzle winding and one-nozzle winding so that the winding wire 46 can be wound by the three-nozzle winding described above and the winding wire 46 of each phase can be appropriately wound without mutual crossing even in a case where the winding wire 46 is wound by one-nozzle winding.

As illustrated in FIGS. 4 and 6, the outer peripheral wall portion 41 of the lower insulator 25 is formed with a first connecting slit 55, a second connecting slit 56, and a third connecting slit 57 connecting two of the plurality of slits 44 that are adjacent in the circumferential direction of the outer peripheral wall portion 41.

A step portion 58 is provided in the first connecting slit 55 such that two slits 44 (44A and 44B) different in depth and extending along the central axis C of the outer peripheral wall portion 41 from one end 41a of the outer peripheral wall portion 41 are connected. Likewise, the step portion 58 is provided in the second connecting slit 56 by connecting two slits 44 (44C and 44D) different in depth. The step portion 58 is provided in the third connecting slit 57 by connecting two slits 44 (44E and 44F) different in depth. It is noted that as for each connecting slit, two slits 44 and 44 different in depth may be connected in the circumferential direction of the central axis C. For example, between the two slits 44 and 44 forming one connecting slit, a hooking portion for the winding wire 46 may be formed so as to protrude to the anti-lead side.

By selectively passing the winding wire 46 through either one of the two slits 44 (44A and 44B) in the first connecting slit 55 in accordance with the one-nozzle winding and three-nozzle winding described above, the winding wire 46 is stretched along the outer peripheral surface of the outer peripheral wall portion 41. Likewise, in the second connecting slit 56, the winding wire 46 is selectively passed through either one of the two slits 44 (44C and 44D). Likewise, in the third connecting slit 57, the winding wire 46 is selectively passed through either one of the two slits 44 (44E and 44F). In other words, either one of the two slits 44, provided in each connecting slit, is a slit through which the winding wire 46 is passed during one-nozzle winding, and the other slit is a slit through which the winding wire 46 is passed during three-nozzle winding.

In addition, in the outer peripheral wall portion 41, the first connecting slit 55 and the second connecting slit 56 are formed adjacent to each other in the circumferential direction of the outer peripheral wall portion 41. The first connecting slit 55 has the first slit 44A, and the second slit 44B less in slit depth than the first slit 44A. The second connecting slit 56 has the third slit 44C, and the fourth slit 44D deeper than the third slit 44C.

Figure 8:
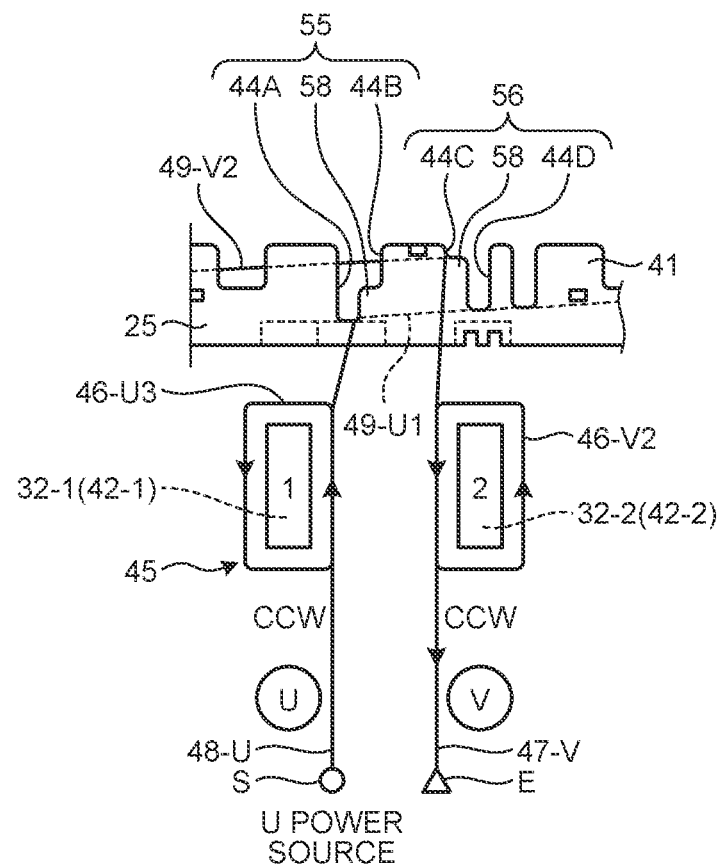
FIG. 8 is an enlarged view illustrating the winding wire that is wound by three-nozzle winding around a main part of the lower insulator in the example.

The depth of the first slit 44A is greater than the depth of the third slit 44C (see FIG. 8). The depth of the second slit 44B is less than the depth of the fourth slit 44D. In addition, the depth of the third slit 44C is less than the depth of the second slit 44B. The depth of the fourth slit 44D is less than the depth of the first slit 44A.

In addition, in the outer peripheral wall portion 41, the first connecting slit 55 and the second connecting slit 56 are formed in order from the left end side toward the right end side in the drawing, which is one direction in the circumferential direction of the outer peripheral wall portion 41. In other words, in the circumferential direction of the outer peripheral wall portion 41, the first connecting slit 55 is disposed near the first insulator teeth portion 42-1, and the second connecting slit 56 is disposed near the second insulator teeth portion 42-2. Therefore, in the outer peripheral wall portion 41, the first slit 44A, the second slit 44B, the third slit 44C, and the fourth slit 44D are formed in order toward the one direction described above. As a result, as will be described later, it is possible to reverse a positional relationship between the first U-phase crossover part 49-U1 and the second V-phase crossover part 49-V2, in the three-nozzle winding and the one-nozzle winding.

In addition, as illustrated in FIG. 6, the depths of the first slit 44A, the second slit 44B, and the third slit 44C are formed so as to decrease in order along the above one direction in the circumferential direction of the outer peripheral wall portion 41 (see FIG. 8). As a result, it is possible to stretch the crossover part 49 of the winding wire 46 at an interval with respect to an up-down direction of the outer peripheral wall portion 41 (axial direction of the rotating shaft 3), and ensure insulation distances between the winding wires 46 of the respective phases.

In addition, the first insulator teeth portion 42-1 of the lower insulator 25 is provided with the winding portion 45 (first stator core teeth portion 32-1) adjacent to the starting end S side of the U-phase power wire 48-U, which is connected to the third U-phase winding wire 46-U3. In the circumferential direction of the outer peripheral wall portion 41, in the first connecting slit 55, the first slit 44A is formed on the side that is close to the first insulator teeth portion 42-1, and the second slit 44B is formed on the side that is far from the first insulator teeth portion 42-1. In this disposition, the first U-phase crossover part 49-U1 extends from the third U-phase winding wire 46-U3 in the one direction described above, and from the first insulator teeth portion 42-1 toward the second insulator teeth portion 42-2 side.

Further, since the depth of the first slit 44A is formed to be greater than the depth of the second slit 44B as described above, movement to the second slit 44B of the first U-phase crossover part 49-U1 passed through the first slit 44A, is suppressed. Therefore, movement and loosening of the winding wire 46, which is stretched over the outer peripheral wall portion 41, is suppressed, and thus the reliability of the insulation state between the winding wires 46 of the respective phases, can be enhanced. In other words, if the depths of the first slit 44A and the second slit 44B are opposite to the above description, that is, if the depth of the first slit 44A is less than the depth of the second slit 44B, the first U-phase crossover part 49-U1 passed through the first slit 44A easily moves from the small-depth first slit 44A to the large-depth second slit 44B, which is not preferable.

In addition, the second insulator teeth portion 42-2 of the lower insulator 25 is provided with the winding portion 45 (second stator core teeth portion 32-2) adjacent to the terminal end E side of the V-phase neutral wire 47-V as the power wire that is connected to the second V-phase winding wire 46-V2. In the circumferential direction of the outer peripheral wall portion 41, in the second connecting slit 56, the third slit 44C is formed on the side that is close to the second insulator teeth portion 42-2, and the fourth slit 44D is formed on the side that is far from the second insulator teeth portion 42-2. In this disposition, the second V-phase crossover part 49-V2 extends up to the second V-phase winding wire 46-V2 in the one direction described above and from the first insulator teeth portion 42-1 toward the second insulator teeth portion 42-2 side.

Further, since the depth of the fourth slit 44D is formed to be greater than the depth of the third slit 44C as described above, movement to the third slit 44C of the second V-phase crossover part 49-V2, which is passed through the fourth slit 44D, is suppressed in the case of one-nozzle winding to be described later (see FIGS. 9 and 10). Therefore, movement and loosening of the winding wire 46, which is stretched over the outer peripheral wall portion 41, is suppressed, and thus the reliability of the insulation state between the winding wires 46 of the respective phases, can be enhanced. In other words, if the depths of the third slit 44C and the fourth slit 44D are opposite to the above description, that is, if the depth of the fourth slit 44D is less than the depth of the third slit 44C, the second V-phase crossover part 49-V2, which is passed through the fourth slit 44D, easily moves from the small-depth fourth slit 44D to the large-depth third slit 44C, which is not preferable.

In addition, the third connecting slit 57 is disposed near the eighth insulator teeth portion 42-8. As in the case of the shape of the first connecting slit 55, the third connecting slit 57 has the fifth slit 44E and the sixth slit 44F less in depth than the fifth slit 44E. In the outer peripheral wall portion 41, the fifth slit 44E and the sixth slit 44F are formed in order toward the one direction described above.

[Main Part of Winding Wire in Three-Nozzle Winding]

FIG. 8 is an enlarged view illustrating the winding wire 46 that is wound by three-nozzle winding around a main part of the lower insulator 25 in the example. As illustrated in FIGS. 6 and 8, in the case of three-nozzle winding, the first U-phase crossover part 49-U1, which is drawn out from the third U-phase winding wire 46-U3, is passed through the first slit 44A of the first connecting slit 55, and stretched along the outer peripheral surface of the outer peripheral wall portion 41. In addition, the second V-phase crossover part 49-V2, which is extended from the first V-phase winding wire 46-V1 (FIG. 6) and stretched over the outer peripheral surface of the outer peripheral wall portion 41, is passed through the third slit 44C of the second connecting slit 56 and wound around the second V-phase winding wire 46-V2.

In this manner, in the case of three-nozzle winding, the first slit 44A of the first connecting slit 55 and the third slit 44C of the second connecting slit 56 are used, and the second slit 44B of the first connecting slit 55 and the fourth slit 44D of the second connecting slit 56 are not used.

In addition, as illustrated in FIG. 6, in the case of three-nozzle winding, the second V-phase crossover part 49-V2, which is drawn out from the first V-phase winding wire 46-V1, is passed through the sixth slit 44F of the third connecting slit 57 and stretched along the outer peripheral surface of the outer peripheral wall portion 41. Therefore, in the case of three-nozzle winding, the sixth slit 44F is used and the fifth slit 44E is not used in the third connecting slit 57. In the case of three-nozzle winding, by the second V-phase crossover part 49-V2 being passed through the sixth slit 44F, the amount of displacement of the second V-phase crossover part 49-V2 extending up to the third slit 44C, with respect to the up-down direction of the outer peripheral wall portion 41 (axial direction of the rotating shaft 3) decreases, and thus the second V-phase crossover part 49-V2 can be smoothly stretched toward the position of the third slit 44C.

[Main Part of Winding Wire in One-Nozzle Winding]

Figure 9:
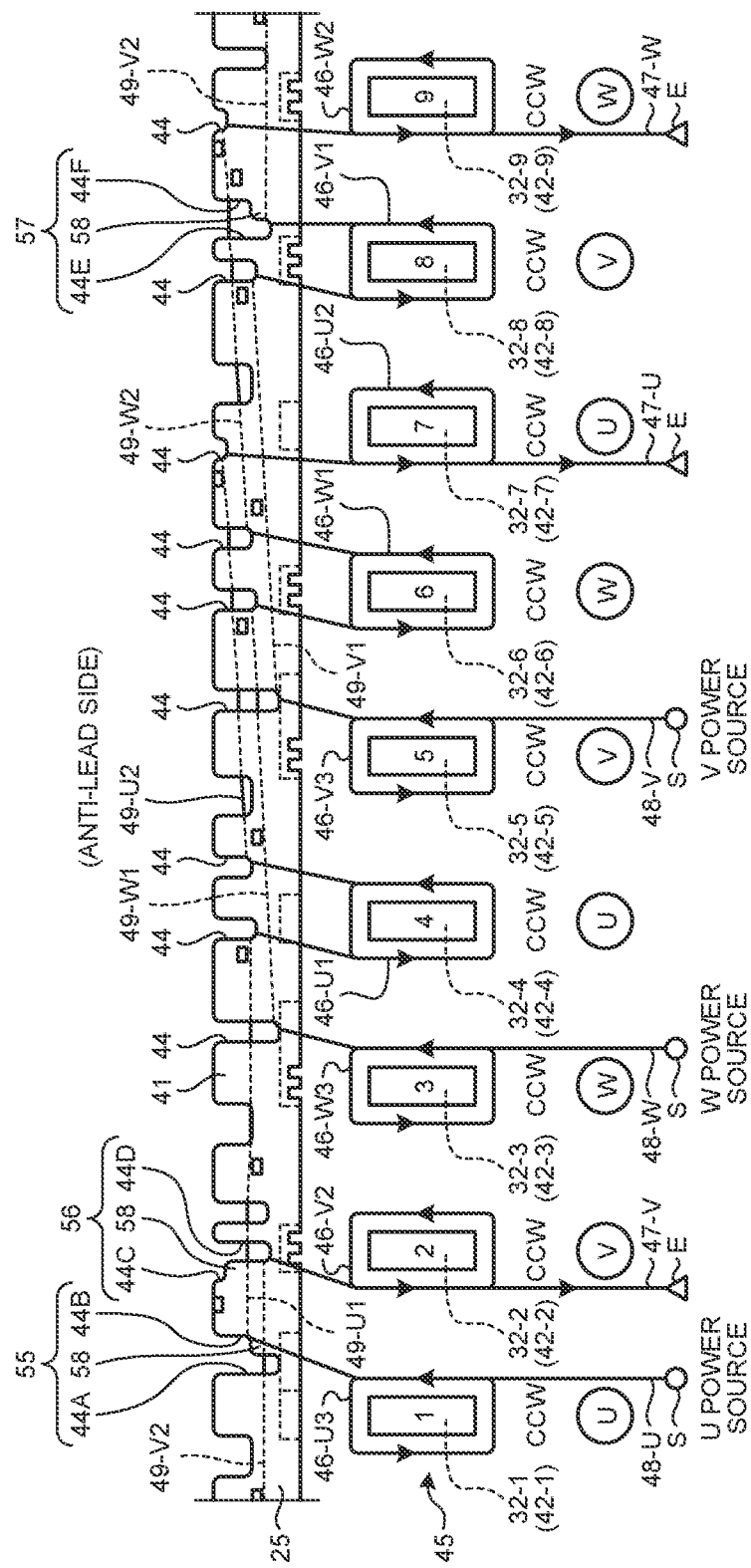
FIG. 9 is a development view illustrating the winding wire of each phase wound by one-nozzle winding with respect to the lower insulator in the example.

FIG. 9 is a development view illustrating the winding wire 46 of each phase wound by one-nozzle winding with respect to the lower insulator 25 in the example. FIG. 10 is an enlarged view illustrating the winding wire 46 wound by one-nozzle winding around the main part of the lower insulator 25 in the example. FIGS. 9 and 10 illustrate, as an example, a state where the winding wires 46 of the respective phases are wound in the order of V, W, and U phases.

In the one-nozzle winding, the winding machine with one nozzle is used to sequentially wind conducting wires of three respective phases (V, W, and U phases) around the lower insulator 25 phase by phase. In a case where the stator 22 is manufactured by winding the winding wire 46 by one-nozzle winding, the winding wire 46 of each phase is wound in the same manner as the three-nozzle winding described above, except that the slits selectively used in the two adjacent slits of the first connecting slit 55 (44A and 44B), the two adjacent slits of the second connecting slit 56 (44C and 44D), and the two adjacent slits of the third connecting slit 57 (44E and 44F) are different, and that the winding wires 46 of the respective phases are wound not simultaneously but in order and phase by phase.

Here, a method for manufacturing the stator 22 in the case of winding the winding wire 46 by the one-nozzle winding using the winding machine equipped with only one nozzle, will be described with reference to FIG. 9 and using a case where the conducting wires of the respective phases are wound in the order of V phase, W phase, and U phase as an example. Here, parts common to the case of three-nozzle winding, will not be described.

First, the V-phase conducting wire, which is wound first among the three phases, will be described. By moving the one nozzle, the winding machine for one-nozzle winding disposes the starting end S, which is one end of the V-phase conducting wire, on the lead side of the fifth stator core teeth portion 32-5 to cause extension from the starting end S as the V-phase power wire 48-V. The winding machine forms the third V-phase winding wire 46-V3 with the V-phase conducting wire by winding the V-phase conducting wire, which is extended from the starting end S, counterclockwise around the fifth stator core teeth portion 32-5. Next, the winding machine moves the nozzle to pass the V-phase conducting wire, which is extended from the third V-phase winding wire 46-V3, through the slit 44 of the outer peripheral wall portion 41, and forms the first V-phase crossover part 49-V1 with the V-phase conducting wire by causing the V-phase conducting wire, which is drawn out from the inner peripheral side to the outer peripheral side of the outer peripheral wall portion 41, to be along the outer peripheral surface of the outer peripheral wall portion 41. Subsequently, the winding machine moves the nozzle to pass the V-phase conducting wire, which is extended from the first V-phase crossover part 49-V1, through the slit 44 and forms the first V-phase winding wire 46-V1 with the V-phase conducting wire by winding the V-phase conducting wire, which is drawn in from the outer peripheral side to the inner peripheral side of the outer peripheral wall portion 41, counterclockwise around the eighth stator core teeth portion 32-8.

Next, the winding machine moves the nozzle to pass the V-phase conducting wire, which is extending from the first V-phase winding wire 46-V1, through the fifth slit 44E of the third connecting slit 57 of the outer peripheral wall portion 41, and forms the second V-phase crossover part 49-V2 with the V-phase conducting wire by causing the V-phase conducting wire, which is drawn out from the inner peripheral side to the outer peripheral side of the outer peripheral wall portion 41, to be along the outer peripheral surface of the outer peripheral wall portion 41. Subsequently, the winding machine moves the nozzle to pass the V-phase conducting wire, which is extended from the second V-phase crossover part 49-V2, through the fourth slit 44D of the second connecting slit 56, and forms the second V-phase winding wire 46-V2 with the V-phase conducting wire by winding the V-phase conducting wire, which is drawn in from the outer peripheral side to the inner peripheral side of the outer peripheral wall portion 41, counterclockwise around the second stator core teeth portion 32-2. Finally, by moving the nozzle, the winding machine disposes the terminal end E, which is the other end of the V-phase conducting wire, on the lead side of the second stator core teeth portion 32-2 to form the V-phase neutral wire 47-V.

The W-phase conducting wire, which is wound next to the V-phase conducting wire among the three phases, is also wound in the same procedure as the V-phase conducting wire by moving the one nozzle. How to wind the W-phase conducting wire, will not be described in detail.

Finally, the U-phase conducting wire, which is wound last among the three phases, will be described. By moving the one nozzle, the winding machine for one-nozzle winding disposes the starting end S, which is one end of the U-phase conducting wire, on the lead side of the first stator core teeth portion 32-1 to cause extension from the starting end S as the U-phase power wire 48-U. The winding machine forms the third U-phase winding wire 46-U3 with the U-phase conducting wire by winding the U-phase conducting wire, which is extended from the starting end S, counterclockwise around the first stator core teeth portion 32-1. Next, the winding machine moves the nozzle to pass the U-phase conducting wire, which is extended from the third U-phase winding wire 46-U3, through the second slit 44B of the first connecting slit 55 of the outer peripheral wall portion 41, and forms the first U-phase crossover part 49-U1 with the U-phase conducting wire by causing the U-phase conducting wire, which is drawn out from the inner peripheral side to the outer peripheral side of the outer peripheral wall portion 41, to be along the outer peripheral surface of the outer peripheral wall portion 41. Subsequently, the winding machine moves the nozzle to pass the U-phase conducting wire, which is extended from the first U-phase crossover part 49-U1, through the slit 44, and forms the first U-phase winding wire 46-U1 with the U-phase conducting wire by winding the U-phase conducting wire, which is drawn in from the outer peripheral side to the inner peripheral side of the outer peripheral wall portion 41, counterclockwise around the fourth stator core teeth portion 32-4.

Next, the winding machine moves the nozzle to pass the U-phase conducting wire, which is extending from the first U-phase winding wire 46-U1, through the slit 44 of the outer peripheral wall portion 41, and forms the second U-phase crossover part 49-U2 with the U-phase conducting wire by causing the U-phase conducting wire, which is drawn out from the inner peripheral side to the outer peripheral side of the outer peripheral wall portion 41, to be along the outer peripheral surface of the outer peripheral wall portion 41. Subsequently, the winding machine moves the nozzle to pass the U-phase conducting wire, which is extended from the second U-phase crossover part 49-U2, through the slit 44, and forms the second U-phase winding wire 46-U2 with the U-phase conducting wire by winding the U-phase conducting wire, which is drawn in from the outer peripheral side to the inner peripheral side of the outer peripheral wall portion 41, counterclockwise around the seventh stator core teeth portion 32-7. Finally, by moving the nozzle, the winding machine disposes the terminal end E, which is the other end of the U-phase conducting wire, on the lead side of the seventh stator core teeth portion 32-7 to form the U-phase neutral wire 47-U.

In this example, in the case of the one-nozzle winding as well as the three-nozzle winding, the three-phase crossover parts 49 are stretched without mutual crossing along the outer peripheral surface of the outer peripheral wall portion 41 of the lower insulator 25 as illustrated in FIG. 9, and insulation distances are ensured between the crossover parts 49. It is noted that even in a case where the V-phase, W-phase, and U-phase winding wires 46 are replaced, by changing the order of winding the winding wires of the respective phases in the one-nozzle winding, insulation distances are ensured between the crossover parts 49 without mutual crossing of the crossover parts 49 of the respective phases.

Figure 10:
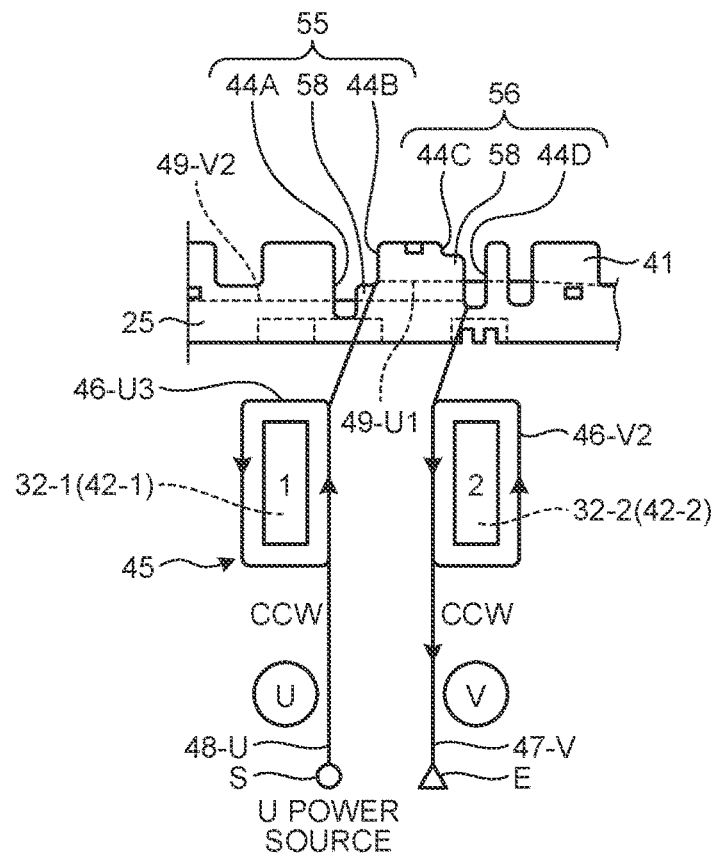
FIG. 10 is an enlarged view illustrating the winding wire wound by one-nozzle winding around the main part of the lower insulator in the example.

As illustrated in FIGS. 9 and 10, in a case where the winding wires 46 are wound in the order of V-phase, W-phase, and U-phase by one-nozzle winding, the second V-phase crossover part 49-V2, which is extended from the first V-phase winding wire 46-V1 (FIG. 9) among the V-phase conducting wires wound first among the three-phase winding wires 46 and stretched over the outer peripheral surface of the outer peripheral wall portion 41, is passed through the fourth slit 44D of the second connecting slit 56, and wound around the second V-phase winding wire 46-V2. In addition, the first U-phase crossover part 49-U1, which is drawn out from the third U-phase winding wire 46-U3 among the U-phase conducting wires wound last among the three-phase winding wires 46, is passed through the second slit 44B of the first connecting slit 55, and stretched along the outer peripheral surface of the outer peripheral wall portion 41.

Figure 13:
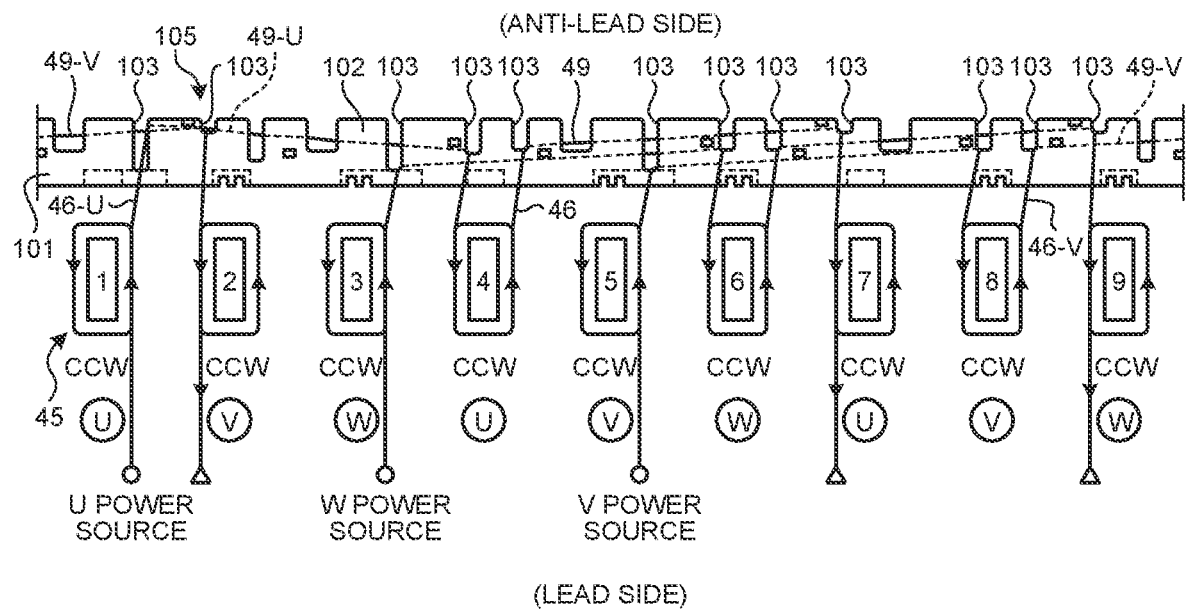
FIG. 13 is a development view illustrating the winding wire of each phase wound by one-nozzle winding around the insulator of the related art.

Therefore, as compared with FIGS. 8 and 10 (or FIGS. 6 and 9), the positional relationship between the first U-phase crossover part 49-U1 and the second V-phase crossover part 49-V2 in the up-down direction of the outer peripheral wall portion 41 (axial direction of the rotating shaft 3), is reversed in the three-nozzle winding and the one-nozzle winding. This is because the depth of the first slit 44A is greater than the depth of the third slit 44C, and the depth of the second slit 44B is less than the depth of the fourth slit 44D as described above, and thus it is possible to reverse the positional relationship between the first U-phase crossover part 49-U1 and the second V-phase crossover part 49-V2 in the three-nozzle winding and the one-nozzle winding. As a result, in a case where the stator 22 is manufactured by one-nozzle winding, the first U-phase crossover part 49-U1 of the U-phase winding wire 46 wound after the V-phase, can be positioned above the second V-phase crossover part 49-V2 of the V-phase winding wire 46 (anti-lead side), and thus it is possible to prevent the first U-phase crossover part 49-U1 and the second V-phase crossover part 49-V2 from crossing each other in the case of one-nozzle winding as in the insulator 101 of the related art illustrated in FIG. 13.

In this manner, in the case of one-nozzle winding, the second slit 44B is selectively used in the first connecting slit 55, the fourth slit 44D is selectively used in the second connecting slit 56, and the first slit 44A of the first connecting slit 55 and the third slit 44C of the second connecting slit 56, used in the case of three-nozzle winding, are not used.

In other words, in this example, the second slit 44B, which is one of the two slits 44 (44A and 44B) provided in the first connecting slit 55, is a slit through which the winding wire 46 is passed during one-nozzle winding, and the first slit 44A, which is the other slit, is a slit through which the winding wire 46 is passed during three-nozzle winding. Likewise, the fourth slit 44D, which is one of the two slits 44 (44C and 44D) provided in the second connecting slit 56, is a slit through which the winding wire 46 is passed during one-nozzle winding, and the third slit 44C, which is the other slit, is a slit through which the winding wire 46 is passed during three-nozzle winding.

In addition, in this example, as illustrated in FIG. 9, in the case of one-nozzle winding, the second V-phase crossover part 49-V2, which is drawn out from the first V-phase winding wire 46-V1, is passed through the fifth slit 44E of the third connecting slit 57, and horizontally stretched along the outer peripheral surface of the outer peripheral wall portion 41. Therefore, in the case of one-nozzle winding, the fifth slit 44E is selectively used and the sixth slit 44F is not used in the third connecting slit 57. In the case of one-nozzle winding, by the second V-phase crossover part 49-V2 being passed through the fifth slit 44E, the amount of displacement of the second V-phase crossover part 49-V2, which is extending up to the fourth slit 44D, with respect to the up-down direction of the outer peripheral wall portion 41 (axial direction of the rotating shaft 3) decreases, and thus the second V-phase crossover part 49-V2 can be smoothly stretched toward the position of the fourth slit 44D. It is noted that the second V-phase crossover part 49-V2 may be passed through the sixth slit 44F of the third connecting slit 57 in the case of one-nozzle winding as well as the case of three-nozzle winding. Although it is possible to stretch the second V-phase crossover part 49-V2 up to the fourth slit 44D of the second connecting slit 56 in this case as well, it becomes difficult to perform the operation of drawing in the crossover 46 through the fourth slit 44D from the outer peripheral side to the inner peripheral side of the outer peripheral wall portion 41 by the second V-phase crossover part 49-V2 of the winding wire 46 being bridged with a downward (lead side) inclination.

As described above, in this example, even if it needs to switch between three-nozzle winding and one-nozzle winding in the process of manufacturing the stator 22, the lower insulator 25 (upper insulator 24) can be shared for the three-nozzle winding and the one-nozzle winding by selectively using one of the first slit 44A and the second slit 44B, and one of the third slit 44C and the fourth slit 44D.

Figure 11:
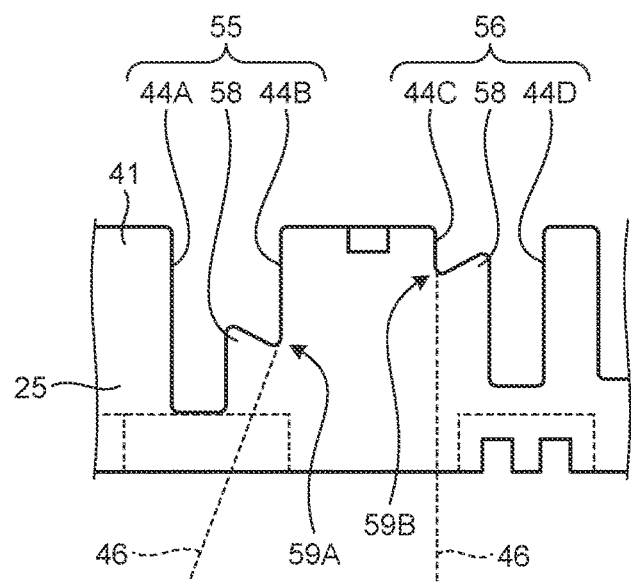
FIG. 11 is an enlarged view illustrating a modification example of the main part of the lower insulator in the example.
Figure 12:
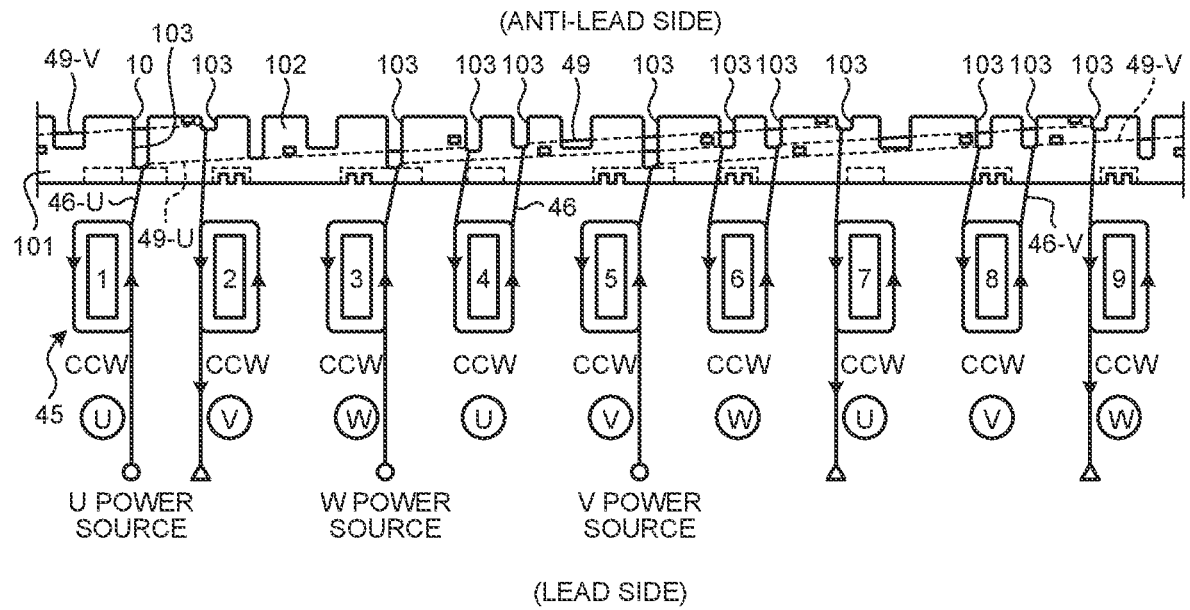
FIG. 12 is a development view illustrating a winding wire of each phase wound by three-nozzle winding around an insulator of the related art.

FIG. 11 is an enlarged view illustrating a modification example of the main part of the lower insulator 25 in the example. As illustrated in FIG. 11, in the first connecting slit 55, a first hooking portion 59A where the winding wire 46 is hooked, is formed on the side in the second slit 44B opposite to the first slit 44A side so as to be greater in depth than the first slit 44A side. In addition, in the second connecting slit 56, a second hooking portion 59B where the winding wire 46 is hooked, is formed on the side in the third slit 44C opposite to the fourth slit 44D side so as to be greater in depth than the fourth slit 44D side.

The first hooking portion 59A and the second hooking portion 59B are formed by inclining the upper end of the step portion 58 downward with respect to the circumferential direction of the outer peripheral wall portion 41. It is noted that the shapes of the first hooking portion 59A and the second hooking portion 59B are not limited to the shape described above and, for example, a recess (not illustrated) may be formed at the upper end of the step portion 58. In addition, although not illustrated, a hooking portion may be formed in the sixth slit 44F of the third connecting slit 57 as well.

As a result, the winding wire 46, which is passed through the second slit 44B in the first connecting slit 55, is appropriately hooked on the second slit 44B by the hooking portion, and thus movement of the winding wire 46 from the second slit 44B to the first slit 44A, is suppressed. Likewise, the winding wire 46, which is passed through the third slit 44C in the second connecting slit 56, is appropriately hooked on the third slit 44C by the hooking portion, and thus movement of the winding wire 46 from the third slit 44C to the fourth slit 44D, is suppressed. As a result, movement and loosening of the winding wire 46, which is stretched over the outer peripheral wall portion 41, is suppressed, and thus the reliability of the insulation state between the winding wires 46 of the respective phases, can be enhanced.

Effect of Example

As described above, in the outer peripheral wall portion 41 of the lower insulator 25 (upper insulator 24) of the three-phase motor 6 of the example, the first connecting slit 55 is formed by connecting two of the plurality of slits 44 that are adjacent to each other in the circumferential direction of the outer peripheral wall portion 41 (first slit 44A and second slit 44B). The first connecting slit 55 is provided with the step portion 58 by connecting the first slit 44A and the second slit 44B, which are two slits different in depth and extending from one end of the outer peripheral wall portion 41. Likewise, in the outer peripheral wall portion 41, the second connecting slit 56 is formed by connecting two slits that are adjacent to each other in the circumferential direction of the outer peripheral wall portion 41 (third slit 44C and fourth slit 44D), and the second connecting slit 56 is provided with the step portion 58 by connecting the third slit 44C and the fourth slit 44D, which are two slits different in depth and extending from one end of the outer peripheral wall portion 41. As for the first connecting slit 55, the winding wire 46 is stretched along the outer peripheral wall portion 41 by the winding wire 46 being selectively passed through either one of the two slits 44 (first slit 44A and second slit 44B). In addition, as for the second connecting slit 56, the winding wire 46 is stretched along the outer peripheral wall portion 41 by the winding wire 46 being selectively passed through either one of the two slits 44 (third slit 44C and fourth slit 44D). In this manner, by selectively using either one of the two slits 44 provided in each connecting slit, the lower insulator 25 (upper insulator 24) in which the three-phase winding portions 45 are formed, can be shared for both the one-nozzle winding and the three-nozzle winding. As a result, it is possible to simplify setup work in the process of manufacturing the three-phase motor 6, and reduce the manufacturing cost of the three-phase motor 6 by molding die generalization and prevention of incorrect insulator use. Further, insulation distances can be appropriately ensured between the winding wires 46 of the respective phases, which are stretched over the outer peripheral wall portion 41.

In addition, in the lower insulator 25 (upper insulator 24) in the example, the first connecting slit 55 has the first slit 44A, and the second slit 44B less in depth than the first slit 44A. The second connecting slit 56 has the third slit 44C, and the fourth slit 44D deeper than the third slit 44C. The depth of the first slit 44A is greater than the depth of the third slit 44C, and the depth of the second slit 44B is less than the depth of the fourth slit 44D. In the outer peripheral wall portion 41, the first slit 44A, the second slit 44B, the third slit 44C, and the fourth slit 44D are formed in order toward one direction in the circumferential direction of the outer peripheral wall portion 41. As a result, the positional relationship between the first U-phase crossover part 49-U1 and the second V-phase crossover part 49-V2, can be reversed in the three-nozzle winding and the one-nozzle winding, and it is possible to prevent the first U-phase crossover part 49-U1 and the second V-phase crossover part 49-V2 from crossing each other in the case of one-nozzle winding as in the insulator 101 of the related art.

In addition, in the outer peripheral wall portion 41 of the lower insulator 25 (upper insulator 24) in the example, the first hooking portion 59A where the winding wire 46 is hooked, is formed on the side in the second slit 44B opposite to the first slit 44A side so as to be greater in depth than the first slit 44A side, and the second hooking portion 59B where the winding wire 46 is hooked, is formed on the side in the third slit 44C opposite to the fourth slit 44D side so as to be greater in depth than the fourth slit 44D side. As a result, the winding wire 46 is appropriately hooked on the second slit 44B, and thus movement of the winding wire 46 from the second slit 44B to the first slit 44A, is suppressed. Likewise, the winding wire 46 is appropriately hooked on the third slit 44C, and thus movement of the winding wire 46 from the third slit 44C to the fourth slit 44D, is suppressed. Therefore, movement and loosening of the winding wire 46, which is stretched over the outer peripheral wall portion 41, is suppressed, and thus the reliability of the insulation state between the winding wires 46 of the respective phases, can be enhanced.

In addition, in the first connecting slit 55 of the lower insulator 25 (upper insulator 24) in the example, in the circumferential direction of the outer peripheral wall portion 41, the first slit 44A is formed on the side that is close to the first insulator teeth portion 42-1, and the second slit 44B is formed on the side that is far from the first insulator teeth portion 42-1. The depth of the first slit 44A is greater than the depth of the second slit 44B. As a result, it is possible to prevent the first U-phase crossover part 49-U1, which is passed through the first slit 44A, from moving to the second slit 44B. Therefore, movement and loosening of the winding wire 46, which is stretched over the outer peripheral wall portion 41, is suppressed, and thus the reliability of the insulation state between the winding wires 46 of the respective phases, can be enhanced.

In addition, in the second connecting slit 56 of the lower insulator 25 (upper insulator 24) in the example, in the circumferential direction of the outer peripheral wall portion 41, the third slit 44C is formed on the side that is close to the second insulator teeth portion 42-2, and the fourth slit 44D is formed on the side that is far from the second insulator teeth portion 42-2. The depth of the fourth slit 44D is less than the depth of the third slit 44C. As a result, in the case of one-nozzle winding, it is possible to prevent the second V-phase crossover part 49-V2, which is passed through the fourth slit 44D, from moving to the third slit 44C. Therefore, movement and loosening of the winding wire 46, which is stretched over the outer peripheral wall portion 41, is suppressed, and thus the reliability of the insulation state between the winding wires 46 of the respective phases, can be enhanced.

It is noted that although the three-phase motor in this example is used for a rotary compressor, the motor may be applied to another compressor such as a scroll compressor.

REFERENCE SIGNS LIST

1 COMPRESSOR
6 THREE-PHASE MOTOR
21 ROTOR
22 STATOR
24 UPPER INSULATOR (INSULATOR)
25 LOWER INSULATOR (INSULATOR)
32-1 to 32-9 STATOR CORE TEETH PORTION (TEETH PORTION)
41 OUTER PERIPHERAL WALL PORTION
42-1 to 42-9 INSULATOR TEETH PORTION (WINDING DRUM PORTION)
44 SLIT
44A FIRST SLIT
44B SECOND SLIT
44C THIRD SLIT
44D FOURTH SLIT
44E FIFTH SLIT
44F SIXTH SLIT
45 WINDING PORTION
46 WINDING WIRE
55 FIRST CONNECTING SLIT
56 SECOND CONNECTING SLIT
57 THIRD CONNECTING SLIT
58 STEP PORTION
59A FIRST HOOKING PORTION
59B SECOND HOOKING PORTION
C CENTRAL AXIS
E TERMINAL END
S STARTING END

The invention claimed is:

1. An insulator that is used in a three-phase motor where a winding portion formed by winding a winding wire is disposed along a circumferential direction of a stator having a tubular shape, and that is fixed to an end portion in a direction of a central axis of the stator, the insulator comprising:
an outer peripheral wall portion having a tubular shape; and a winding drum portion that is provided on an inner periphery of the outer peripheral wall portion and around which the winding wire is wound, wherein
the outer peripheral wall portion has a plurality of slits that are formed to extend from one end in a direction of a central axis of the outer peripheral wall portion along the central axis and through which the winding wire, drawn out from the winding portion, is passed,
in the outer peripheral wall portion, a connecting slit is formed in which a step portion is provided by connecting two of the plurality of slits that are adjacent to each other in a circumferential direction of the outer peripheral wall portion, that extend from the one end, and that are different in depth,
the connecting slit includes a first connecting slit and a second connecting slit, which are formed adjacent to each other in the circumferential direction of the outer peripheral wall portion,
the first connecting slit has a first slit and a second slit less in the depth than the first slit,
the second connecting slit has a third slit and a fourth slit greater in the depth than the third slit, and
in the outer peripheral wall portion, the first slit, the second slit, the third slit, and the fourth slit are formed in order toward one direction in the circumferential direction of the outer peripheral wall portion.

2. An insulator that is used in a three-phase motor where a winding portion formed by winding a winding wire is disposed along a circumferential direction of a stator having a tubular shape, and that is fixed to an end portion in a direction of a central axis of the stator, the insulator comprising:
an outer peripheral wall portion having a tubular shape; and a winding drum portion that is provided on an inner periphery of the outer peripheral wall portion and around which the winding wire is wound, wherein
the outer peripheral wall portion has a plurality of slits that are formed to extend from one end in a direction of a central axis of the outer peripheral wall portion along the central axis and through which the winding wire, drawn out from the winding portion, is passed,
in the outer peripheral wall portion, a connecting slit is formed in which a step portion is provided by connecting two of the plurality of slits that are adjacent to each other in a circumferential direction of the outer peripheral wall portion, that extend from the one end, and that are different in depth, and
in the connecting slit, either one of the two slits is a slit through which the winding wire is passed during one-nozzle winding, and the other slit is a slit through which the winding wire is passed during three-nozzle winding.

3. The insulator according to claim 2, wherein
the connecting slit includes a first connecting slit and a second connecting slit, which are formed adjacent to each other in the circumferential direction of the outer peripheral wall portion.

4. The insulator according to claim 3, wherein
the first connecting slit has a first slit and a second slit less in the depth than the first slit,
the second connecting slit has a third slit and a fourth slit greater in the depth than the third slit, and
in the outer peripheral wall portion, the first slit, the second slit, the third slit, and the fourth slit are formed in order toward one direction in the circumferential direction of the outer peripheral wall portion.

5. The insulator according to claim 4, wherein
the depth of the first slit is greater than the depth of the third slit, and
the depth of the second slit is less than the depth of the fourth slit.

6. The insulator according to claim 4, wherein
the first slit and the third slit are slits through which the winding wire is passed during three-nozzle winding, and the second slit and the fourth slit are slits through which the winding wire is passed during one-nozzle winding.

7. The insulator according to claim 4, wherein
the outer peripheral wall portion is formed with at least one of a first hooking portion, which is formed on a side in the second slit opposite to a side of the first slit so as to be greater in the depth than the side of the first slit and where the winding wire is hooked, and a second hooking portion, which is formed on a side in the third slit opposite to a side of the fourth slit so as to be greater in the depth than the side of the fourth slit and where the winding wire is hooked.

8. The insulator according to claim 4, wherein
in the first connecting slit, in the circumferential direction of the outer peripheral wall portion, the first slit is formed on a side close to the winding drum portion where the winding portion adjacent to a starting end side of a power wire, which is connected to the winding wire, is provided, and the second slit is formed on a side far from the winding drum portion, and
the depth of the first slit is greater than the depth of the second slit.

9. The insulator according to claim 4, wherein
in the second connecting slit, in the circumferential direction of the outer peripheral wall portion, the third slit is formed on a side close to the winding drum portion where the winding portion adjacent to a terminal end side of a power wire, which is connected to the winding wire, is provided, and the fourth slit is formed on a side far from the winding drum portion, and
the depth of the fourth slit is greater than the depth of the third slit.

10. The insulator according to claim 2, wherein
the winding drum portions are nine or more and a multiple of three in number.

11. A motor comprising: the insulator according to claim 1; the stator; a rotor that is rotated by a magnetic field generated by the stator; and the winding wire that forms the winding portion of three phases.

* * * * *